(12) United States Patent
Zhang

(10) Patent No.: US 11,405,830 B2
(45) Date of Patent: Aug. 2, 2022

(54) INFORMATION TRANSMISSION METHOD AND APPARATUS

(71) Applicant: ZTE Corporation, Shenzhen (CN)

(72) Inventor: Dongying Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 161 days.

(21) Appl. No.: 16/611,501

(22) PCT Filed: May 9, 2018

(86) PCT No.: PCT/CN2018/086135
§ 371 (c)(1),
(2) Date: Nov. 7, 2019

(87) PCT Pub. No.: WO2018/205949
PCT Pub. Date: Nov. 15, 2018

(65) Prior Publication Data
US 2020/0229048 A1 Jul. 16, 2020

(30) Foreign Application Priority Data
May 9, 2017 (CN) .......................... 201710322391.2

(51) Int. Cl.
*H04W 36/00* (2009.01)
*H04W 36/08* (2009.01)
(Continued)

(52) U.S. Cl.
CPC ....... *H04W 36/0033* (2013.01); *H04W 36/08* (2013.01); *H04W 80/02* (2013.01); *H04W 92/20* (2013.01)

(58) Field of Classification Search
None
See application file for complete search history.

(56) References Cited

U.S. PATENT DOCUMENTS

| 2019/0124620 A1* | 4/2019 | Liang ................. H04W 76/27 |
| 2020/0015132 A1* | 1/2020 | Liu ................. H04W 72/0413 |

(Continued)

FOREIGN PATENT DOCUMENTS

| CN | 1933664 A | 3/2007 |
| CN | 103227982 A | 7/2013 |

(Continued)

OTHER PUBLICATIONS

International Search Report for corresponding application PCT/CN2018/086135 filed May 9, 2018; dated Jul. 18, 2018.

(Continued)

*Primary Examiner* — Saba Tsegaye
(74) *Attorney, Agent, or Firm* — Cantor Colburn LLP

(57) ABSTRACT

Disclosed is an information transmission method. The method includes: a first network node establishes a common transmission channel with a second network node; the first network node receives uplink information sent by a terminal device, where the terminal device is in an inactive state and moves from a service area of the second network node to a service area of the first network node; the first network node sends, by means of the common transmission channel, the uplink information and identification information of the terminal device to the second network node; and the first network node receives, by means of the common transmission channel, a parsing result obtained from parsing the uplink information by the second network node. Also disclosed is an information transmission apparatus.

17 Claims, 9 Drawing Sheets

(51) Int. Cl.
*H04W 80/02* (2009.01)
*H04W 92/20* (2009.01)

(56) References Cited

U.S. PATENT DOCUMENTS

2020/0077307 A1* 3/2020 Li ..................... H04W 48/20
2020/0112879 A1* 4/2020 Shimoda ............ H04W 28/06

FOREIGN PATENT DOCUMENTS

| CN | 106604335 A | 4/2017 |
|---|---|---|
| EP | 3606118 A1 | 2/2020 |
| WO | 2014101062 A1 | 7/2014 |
| WO | 2015030458 A1 | 3/2015 |
| WO | 2016155089 A1 | 6/2016 |
| WO | 2018014741 A1 | 1/2018 |
| WO | 2018130049 A1 | 7/2018 |

OTHER PUBLICATIONS

"3rd Generation Partnership Project; Technical Specification Group Radio Access Network", 3GPP Draft, May 6, 2017, XP051265743.
Anonymous, "3rd Generation Partnership Project: Technical Specification Group Services and System Aspects: Study on Architecture for Next Generation", 3GPP Standard, vol. SA Wg2, No. V14.0.0, Dec. 16, 2016, pp. 1-527, XP051295448.
European Search Report for corresponding application EP 18 79 7604; Report dated Jan. 15, 2021.
Huawei, "TP on Mobility Procedures to 38.401", 3GPP TSG-RAN WG3 Meeting #96, Hangzhou China, May 15-19, 2017, R3-171840.
Huawei, UL Data Transmission Without RRC Signaling Without Initiating Transition to Active (Option A), 3GPP TGS-RAN NR Adhoc, Spokane (WA), USA, Nov. 14-18, 2016, R21700185.
Nokia, "Resolution of Open Issues on F1 Interface Functions", 3GPP TSG-RAN WG3 Meeting #96, Hangzhou, China May 15-19, 2017, R3-171434.
Nokia, "Data Transmission in INACTIVE", 3GPP TSG-RAN WG2 Meeting #96, Reno USA, Nov. 14-18, 2016, R2-167706.
Nokia, "Introduction of F1 Interface Functions", 3GPP TSG-RAN WG3 Meeting #96, Hangzhou, China May 15-19, 2017, R3-171436.
Nokia, "TP of Definition and Naming of CU and DU", 3GPP TSG-RAN WG3 meeting #96 Hangzhou, China May 15-19, 2017, R3-171453.
Nokia, F1 Interface RAN3 stage 2-38.401, #GPP TSG-RAN WG3 Meeting #95-bis, Spokane USA, Apr. 3-7, 2017, R3-171362.
Samsung, "Way forward for UL data in INACTIVE", 3GPP TSG-RAN WG2 Meeting #98, Hangzhou, China May 15-19, 2017, R2-1705608.
Handling token and key derivation tor data transmitting in RRC_INACTIVE, ZTE, 3GPP TSG SA WG3 (Security) Meeting #86, Feb. 6-10, 2017, Sophia Antipolis (France), S3-170106.
INACTIVE mode procedures in NR. Nokia, Alcatel-Lucent Shanghai Bell, 3GPP TSG-RAN WG2 NR #97, Athens, Greece, Feb. 13-17, 2017, R2-1701066.
Korean Office Action for corresponding application 10-2019-7036141 filed Dec. 6, 2019; Report dated Nov. 24, 2020.
Procedure for Data transmission in RRC_Inactive, Mediatek Inc, 3GPP TSG-RAN WG2 Meeting #97, Athens, Greece, Feb. 13-17, 2017, R2-1701732.
Small data transmission in inactive state, Qualcomm Incorporated, 3GPP TSG-RAN WG3 NR Ad Hoc Meeting, Spokane, Washington, USA, Jan. 17-19, 2017, R3-170158.
Chinese Office Action for corresponding application 201710322391. 2: Report dated Oct. 29, 2021.
Chinese Search Report for corresponding application 201710322391. 2: Report dated Oct. 22, 2021.

* cited by examiner

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | UE-ID | | | | | | | |
| 3 | UE-ID | | | | | | | |
| 4 | Message Type | | | | | | | |
| 5 | Length (1$^{st}$ Octet) | | | | | | | |
| 6 | Length (2$^{nd}$ Octet) | | | | | | | |
| 7 | Tunnel Endpoint Identifier (1$^{st}$ Octet) | | | | | | | |
| 8 | Tunnel Endpoint Identifier (2$^{nd}$ Octet) | | | | | | | |
| 9 | Tunnel Endpoint Identifier (3$^{rd}$ Octet) | | | | | | | |
| 10 | Tunnel Endpoint Identifier (4$^{th}$ Octet) | | | | | | | |
| 11 | Sequence Number (1$^{st}$ Octet)[1) 4)] | | | | | | | |
| 12 | Sequence Number (2$^{nd}$ Octet)[1) 4)] | | | | | | | |
| 13 | N-PDU Number[2) 4)] | | | | | | | |
| 14 | Next Extension Header Type[3) 4)] | | | | | | | |

FIG. 5

INFORMATION TRANSMISSION METHOD AND APPARATUS

CROSS-REFERENCE TO RELATED APPLICATIONS

This is a National Stage Application, filed under 35 U.S.C. 371, of International Patent Application No. PCT/CN2018/086135, filed on May 9, 2018, which claims priority to Chinese patent application No. 201710322391.2 filed on May 9, 2017, contents of both of which are incorporated herein by reference in their entireties.

TECHNICAL FIELD

The present disclosure relates to, but is not limited to, the field of wireless communication technology and, for example, to an information transmission method and apparatus.

BACKGROUND

With the development of wireless communication technology, information transmission manners between a terminal device and a base station are defined in new standards. For example, the current 3rd generation partnership project (3GPP) standard supports the terminal device to transmit uplink/downlink data in an inactive state or a light connection state.

In the inactive state, because the terminal device is likely to move, i.e., the base station to which the terminal device belongs may change, when the uplink data of the terminal device reaches a new base station, since the new base station (hereinafter referred to as a target base station) does not have information related to a context of the terminal device and the like, and thus the target base station does not decode the uplink information sent by the terminal device. In consideration of the above, the target base station requests a source base station for the relevant information such as the context of the terminal device and the like, and the source base station forwards the relevant information such as the context of the terminal device and the like to the target base station, for example, the source base station forwards the relevant information such as the context of the terminal device and the like to the target base station through an X2 interface in a long term evolution (LTE) system. Although the target base station side has the relevant information such as the context of the terminal device and the like for decoding the uplink information sent by the terminal device. However, a process of requesting the relevant information such as the context of the terminal device and the like from the source base station by the target base station is time consuming, thereby causing a large network delay.

SUMMARY

Embodiments of the present application provide an information transmission method and apparatus.

In an embodiment, an embodiment of the present application provides an information transmission method, the method includes:

a first network establishes a common transmission channel with a second network node, where a reserved character for identifying a terminal device is configured in a user plane protocol of the common transmission channel;

the first network node receives uplink information sent by the terminal device, where the terminal device is in an inactive state and moves from a service area of the second network node to a service area of the first network node;

the first network node sends the uplink information and identification information of the terminal device to the second network node via the common transmission channel, where the first network node fills the identification information of the terminal device in the reserved character while sending the uplink information; and the first network node receives, via the common transmission channel, a parsing result obtained from parsing the uplink information by the second network node, where the parsing result is obtained from parsing the uplink information by the second network node according to the identification information of the terminal device.

In an embodiment, an embodiment of the present application provides an information transmission method, the method includes:

a second network node establishes a common transmission channel with a first network node, where a reserved character for identifying a terminal device is configured in a user plane protocol of the common transmission channel;

the second network node receives, via the common transmission channel, uplink information and identification information of the terminal device sent by the first network node, where the uplink information is sent from the terminal device in an inactive state to the first network node after the terminal device moves from a service area of the second network node to a service area of the first network node, and the first network node fills the identification information of the terminal device in the reserved character while sending the uplink information;

the second network node parses the uplink information according to the identification information of the terminal device to obtain a parsing result; and the second network node sends the parsing result to the first network node via the common transmission channel.

In an embodiment, an embodiment of the present application provides an information transmission method, the method includes:

a first network establishes a common transmission channel with a second network node, where a reserved character for identifying a terminal device is configured in a user plane protocol of the common transmission channel;

the first network node receives, via the common transmission channel from the second network node, downlink information to be sent to the terminal device and identification information of the terminal device, where the terminal device is in an inactive state and moves from a service area of the second network node to a service area of the first network node, and the second network node fills the identification information of the terminal device in the reserved character while sending the downlink information to the first network node; and the first network node sends the downlink information to the terminal device matched with the identification information of the terminal device according to the identification information of the terminal device.

In an embodiment, an embodiment of the present application provides an information transmission method, the method includes:

a second network node establishes a common transmission channel with a first network node, where a reserved character for identifying a terminal device is configured in a user plane protocol of the common transmission channel; and the second network node sends downlink information to be sent to the terminal device and identification information of the terminal device to the first network node via the common transmission channel, where the terminal device is in an inactive state and moves from a service area of the second network node to a service area of the first network node, and the second network node fills the identification information of the terminal device in the reserved character while sending the downlink information to the first network node.

In an embodiment, an embodiment of the present application provides an information transmission apparatus, arranged in a first network node, where the information transmission apparatus includes a first establishing module, a first receiving module and a first sending module. The first establishing module is configured to establish a common transmission channel with a second network node, where a reserved character for identifying a terminal device is configured in a user plane protocol of the common transmission channel. The first receiving module is configured to receive uplink information sent by the terminal device, where the terminal device is in an inactive state and moves from a service area of the second network node to a service area of the first network node, moreover, the first receiving module is further configured to receive, via the common transmission channel, a parsing result obtained from parsing the uplink information by the second network node, where the parsing result is obtained from parsing the uplink information by the second network node according to the identification information of the terminal device. The first sending module is configured to send the uplink information and identification information of the terminal device to the second network node via the common transmission channel, where the first network node fills the identification information of the terminal device in the reserved character while sending the uplink information.

In an embodiment, an embodiment of the present application provides an information transmission apparatus, arranged in a second network node, where the information transmission apparatus includes a second establishing module, a second receiving module, a parsing module and a second sending module. The second establishing module is configured to establish a common transmission channel with a first network node, where a reserved character for identifying a terminal device is configured in a user plane protocol of the common transmission channel. The second receiving module is configured to receive, via the common transmission channel, uplink information and identification information of the terminal device sent by the first network node, where the uplink information is sent from the terminal device in an inactive state to the first network node after the terminal device moves from a service area of the second network node to a service area of the first network node, and the first network node fills the identification information of the terminal device in the reserved character while sending the uplink information. The parsing module is configured to parse the uplink information according to the identification information of the terminal device received by the receiving module to obtain a parsing result. The second sending module is configured to send the parsing result obtained by the parsing module to the first network node via the common transmission channel.

In an embodiment, an embodiment of the present application provides an information transmission apparatus, arranged in a first network node, where the information transmission apparatus includes a third establishing module, a third receiving module and a third sending module. The third establishing module is configured to establish a common transmission channel with a second network node, where a reserved character for identifying a terminal device is configured in a user plane protocol of the common transmission channel. The third receiving module is configured to receive, via the common transmission channel from the second network node, downlink information to be sent to the terminal device and identification information of the terminal device, where the terminal device is in an inactive state and moves from a service area of the second network node to a service area of the first network node, and the second network node fills the identification information of the terminal device in the reserved character while sending the downlink information to the first network node. The third sending module is configured to send the downlink information to the terminal device matched with the identification information of the terminal device according to the identification information of the terminal device received by the receiving module.

In an embodiment, an embodiment of the present application provides an information transmission apparatus, arranged in a second network node, where the information transmission apparatus a fourth establishing module and a fourth sending module. The fourth establishing module is configured to establish a common transmission channel with a first network node, where a reserved character for identifying a terminal device is configured in a user plane protocol of the common transmission channel. The fourth sending module is configured to send downlink information to be sent to the terminal device and the identification information of the terminal device to the first network node via the common transmission channel, where the terminal device is in an inactive state and moves from a service area of the second network node to a service area of the first network node, and the second network node fills the identification information of the terminal device in the reserved character while sending the downlink information to the first network node.

The information transmission method and apparatus provided in the embodiment of the present application can reduce the network delay for information transmission.

BRIEF DESCRIPTION OF DRAWINGS

FIG. 5 is a schematic diagram of a data structure of a GTP-U protocol provided in an embodiment of the present disclosure;

DETAILED DESCRIPTION

Steps shown in flowcharts of the accompanying drawings may be performed, for example, in a computer system including a set of computer executable instructions. Also, while a logical order is shown in the flowcharts, the steps shown or described may be performed in a different order from the one described herein.

Figure 1:
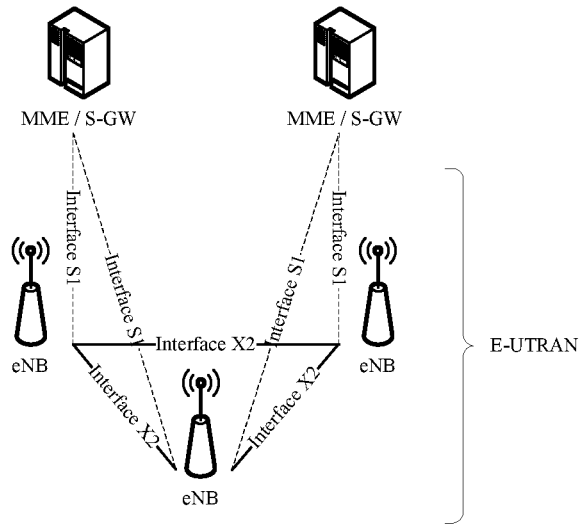
FIG. 1 is a schematic diagram of a network architecture of an LTE system in an embodiment.

Before an information transmission method provided in an embodiment of the present application is described, firstly, a basic network construction under a LTE system is briefly introduced. FIG. 1 is a schematic diagram of a network architecture of the LTE system in an embodiment. The LTE system includes an evolved universal terrestrial radio access network (E-UTRAN) and a core network (CN), where the E-UTRAN includes an evolved node b (eNB), and the CN includes a mobile management entity (MME) and a serving gateway (S-GW) and the like. The eNB and the CN are connected through an S1 interface, the eNBs are connected through an X2 interface, and one eNB may manage one or more cells. A terminal device is also called a user equipment (UE), and an interface between the UE and the cell is called a Uu interface (or called an air interface) (in FIG. 1, the cell managed by the eNB and the Uu interface are not shown).

In the LTE system, according to the protocol, the terminal device communicates with a base station, firstly, the terminal device accesses the base station, i.e., the terminal device in a non-link state establishes a connection with the base station through a random access process, and then communicate may be made. The general random access process has two ways, which are described separately below.

Figure 2:
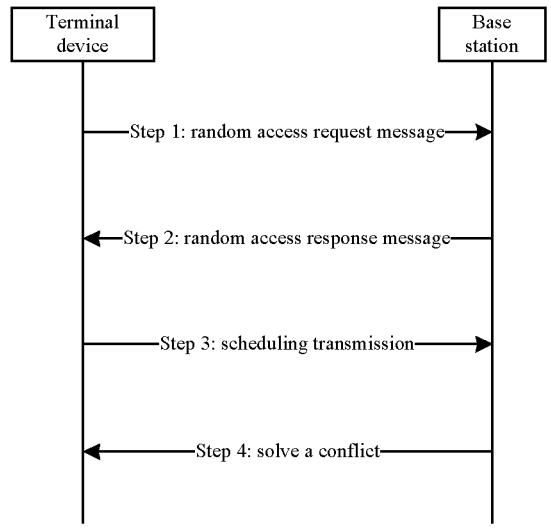
FIG. 2 is a flowchart of a four-step random access process in an LTE system in an embodiment.

FIG. 2 is a flowchart of a four-step random access process in an LTE system in an embodiment. A competition-based random access process generally includes four steps described below.

In step 1, the terminal device sends a random access request message. The terminal device learns an available preamble sequence code set for random access and a time-frequency position for sending the preamble sequence by means of system information or radio resource control (RRC) signaling for example, then, randomly selects the preamble sequence and the time-frequency position for sending the preamble sequence in available resources, and sends the preamble sequence and the time-frequency position to the base station.

In step 2, the base station sends a random access response message. The base station determines a random access radio network temporary identity (RA-RNTI) which is set for random access and possibly adopted by the terminal by means of the time-frequency position adopted by the random access preamble sequence for example, and after the base station successfully decodes the preamble sequence, the base station replies a random access response to the terminal, where the response carries information such as uplink authorization and the like.

In step 3, scheduling transmission is performed. The terminal sends an uplink data on an uplink authorized resource and carries information such as an identifier of the terminal and the like.

In step 4, the base station parses the uplink data on the uplink authorized resource, confirms the terminal, solves a conflict, and sends a competition resolution identifier to the terminal.

As may be seen from the random access process shown in FIG. 2, the terminal device spends a more signaling overhead and takes a longer time to access a network device. Therefore, a time delay for executing the network verification is long, and the demand of a service for the low time delay is difficult to satisfy.

Figure 3:
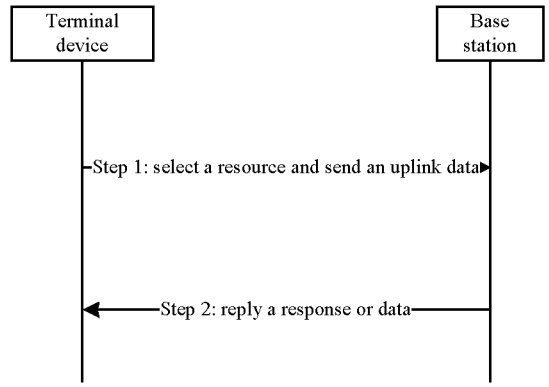
FIG. 3 is a flowchart of a two-step random access process in an LTE system in an embodiment.

As the demand of the service for the low time delay increases, the simplification of the random access process has also gradually attracted people's attention, especially the non-orthogonal multiple access technology is recognized, and the random access process may be simplified into a two-step random access process. The terminal device may send the uplink data to the base station in a case of grant free. FIG. 3 is a flowchart of a two-step random access process in an LTE system in an embodiment, which mainly includes two steps described below.

In step 1, the terminal selects resources in a resource pool without scheduling and sends an uplink data.

In step 2, the base station replies a response or data after parsing the uplink data.

The two-step random access process shown in FIG. 3 reduces the network access delay of the terminal device and the signaling overhead between the terminal device and the network device. However, the four-step random access process shown in FIG. 2 is more beneficial to solve the conflict, and in practical applications, which random access process may be selected to use according to practical situations.

As described below, the terminal device in each embodiment refers to the terminal device in an inactive state or a light connection state, for example the UE, a second network node is a source serving base station of the terminal device, and a first network node is a new serving base station to which the terminal device moves when the terminal device is in the inactive state. The following embodiments provided in the present application may be combined with each other, and details of the same or similar concepts or processes may not be repeated in some embodiments.

In an embodiment, the terminal device in the embodiment of the present application is the terminal device in the inactive state or the light connection state, and may adopt a standard protocol related to an inactive state technology and the light connection state technology. The LTE system has several technologies for reducing the signaling overhead, including a light connected UE in the standardization process of a LTE R14 and an inactive state of the 5th generation mobile communication (5G) system and the like. Under the condition that the terminal device has no data transmission, a "lighter" connection state or the inactive state may be kept between the terminal device and the network device. For example, in the inactive state technology, a RRC connection is disconnected between the terminal device and the network device, while the base station always maintains a S1 interface connection related to the terminal device, and when the terminal device in the inactive state has data to be sent, the connection between the terminal device and the network device needs to be reestablished. The terminal device in the inactive state described below also means that the terminal device is in the light connection state.

Figure 4:
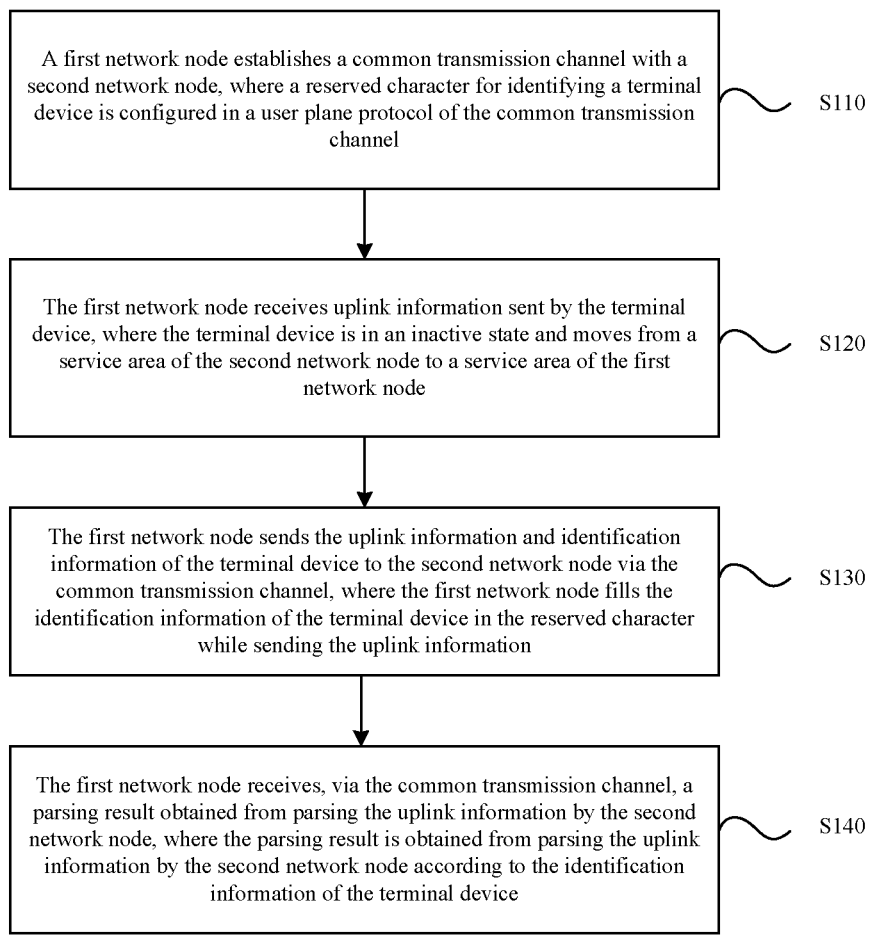
FIG. 4 is a flowchart of an information transmission method provided in an embodiment of the present application.

FIG. 4 is a flowchart of an information transmission method provided in an embodiment of the present application. The information transmission method provided in this embodiment is applicable to the situation that the terminal device in the inactive state or the light connection state performs information transmission with the source serving base station after moving out of a service area of the source serving base station, and the method may be executed by an information transmission apparatus, where the information transmission apparatus is implemented by combining a hardware and a software, and the apparatus may be integrated in a processor of a first network node (i.e., a target serving base station) for the processor to invoke. As shown in FIG. 4, the method of this embodiment may include steps described below.

In step S110, the first network node establishes a common transmission channel with the second network node, where a reserved character for identifying the terminal device is configured in a user plane protocol of the common transmission channel.

The information transmission method provided in the embodiment of the present application is a method for transmitting information between the terminal device and the source serving base station. An application scenario of the embodiment of the present application is that: the terminal device in the inactive state or the light connection state moves out of the service area of the second network node and moves to a service area of the first network node. When uplink information of the terminal device reaches the second network node or the downlink data of the second network node reaches the terminal device, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a general packet radio service (GPRS) tunneling protocol (GTP). Since the X2 interface and the S1 interface, which are common in the LTE system, are based on a GTP protocol, the GTP tunnel is identified by a GTP tunnel endpoint and an internet protocol (IP) address, including a source tunnel endpoint identifier (TEID), a destination TEID, a source IP address, and a destination IP address. A receiving end of the GTP tunnel allocates a TEID value for the sending end to use, the TEID value performs the interaction of the TEID value through the GTP control message (e.g. GTP-C), and the association between a control plane and a user plane is performed at the moment of exchange: a TEID of the control plane (C) and a TEID born by the user plane (U) have an association relationship. In this embodiment of the present application, the common transmission channel may be established between the first network node and the second network node, where the common transmission channel established between the first network node and the second network node is used for transmitting data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP user plane (GTP-U) protocol, and the reserved character is used to fill identification information of the terminal device in the subsequent information transmission.

In step S120, the first network node receives the uplink information sent by the terminal device, where the terminal device in the inactive state and moves from the service area of the second network node to the service area of the first network node.

In step S130, the first network node sends the uplink information and the identification information of the terminal device to the second network node via the common transmission channel, where the first network node fills the identification information of the terminal device in the reserved character while sending the uplink information.

In this embodiment, since the terminal device has moved out of the service area of the second network node and enters the service area of the first network node, when the terminal device has uplink data to be transmitted, the first network node receives the uplink information (including uplink data/uplink control information) sent by the terminal device, and the first network node may forward the uplink information to the second network node, and since the reserved character for identifying the terminal device has been configured in the user plane protocol of the common transmission channel in S110, the first network node may fill the identification information of the terminal device in the reserved character and send the identification information of the terminal device to the second network node while sending the uplink information.

In an embodiment, the identification information of the terminal device in this embodiment of the present application is filled in a GTP-U protocol header, that is, filled in the reserved character configured when the common transmission channel is established, for example, the identification information of the terminal device may be a resume ID or a truncated resume ID. FIG. 5 is a schematic diagram of a data structure of a GTP-U protocol provided in an embodiment of the present application. The terminal device identifier (UE-ID) in FIG. 5 is the reserved character added in the GTP-U protocol, and the first network node knows the source serving base station (i.e., the second network node) of the terminal device after receiving the uplink information of the terminal device, however, since the common transmission channel (i.e., the GTP tunnel) between the first network node and the second network node is common, if the second network node only receives the uplink information, it does not know which terminal device the uplink information is sent by, therefore, the first network node carries the identification information of the terminal device while sending the uplink information, and the identification information of the terminal device is used for instructing the second network node to correctly decode the uplink information. In addition, since a number of bytes of the resume ID is large, usually 5 bytes, i.e., 40 bits, and multiple rows of positions in the GTP-U protocol are occupied, the UE-ID may also be the truncated resume ID or other forms of UE-IDs.

In step S140, the first network node receives, via the common transmission channel, a parsing result obtained from parsing the uplink information by the second network node, where the parsing result is obtained from parsing the uplink information by the second network node according to the identification information of the terminal device.

In this embodiment, since the second network node (the source serving base station of the terminal device) has the context information of the terminal device, and the first network node carries the identification information of the terminal device whiling sending the uplink information to the second network node, the second network node may perform correct data parsing on the uplink information sent by the terminal device, after obtaining the parsing result, the second network node may also send the parsing result to the first network node (the base station of the terminal device that sends the uplink data) via the common transmission channel common to the first network node, and the first network node receives the uplink information sent by the terminal device. At this time, the transmission task of the uplink information of the terminal device is completed.

The different between the information transmission method provided in the embodiment of the present application and the related technology mainly lies in: in a manner that the terminal device in the inactive state in the LTE system of the related art carries out uplink information transmission after moving out of the source base station, the target base station requests the source base station for related information such as context of the terminal device and the like, which is time consuming and causes a large network delay. In the information transmission method provided in the embodiment of the present application, for the terminal device in the light connection state in the standardization process of the LTE R14 and in the inactive state in the 5G system, when the uplink information of the terminal device reaches, after the first network node (i.e., the target base station) receives the uplink information, the first network node sends the uplink information to the second network node (i.e., the source base station), and the uplink information may be sent via the common transmission channel established between the first network node and the second network node. Since the reserved character for identifying the terminal device is configured in the user plane protocol of the common transmission channel, the first network node may fill the identification information of the terminal device in the reserved character upon receiving the uplink information, namely the identification information of the terminal device is simultaneously sent, such that the second network node knows the terminal device sending the uplink information after receiving the uplink information, whereby the uplink information is parsed in a correct way, and then the parsing result is fed back to the first network node. The information transmission method provided in the embodiment of the present application saves the process that the first network node requests the second network node for the context information of the terminal device, saves the signaling overhead, and is beneficial to reduce the network delay of a parsing data.

In the information transmission method provided in the embodiment of the present application, by means of the common transmission channel established between the first network node and the second network node and of the reserved character configured in the user plane protocol of the common transmission channel and used for identifying the terminal device, after the first network node receives uplink information sent by the terminal device that moves out of the service area of the second network node, the first network node sends the uplink information and the identification information of the terminal device to the source serving base station (i.e., a second network node) of the terminal device via the common transmission channel, and then, the first network node may receive, via the common transmission channel, the parsing result obtained by parsing the uplink information by the second network node.

The information transmission method provided in the embodiment of the present application is not only applicable to a traditional integrated base station, but also applicable to a central unit (CU) and distributed unit (DU) (i.e., CU-DU) network architecture.

In an application scenario of the integrated base station, the first network node is the target base station of the terminal device, and the second network node is the source base station of the terminal device. The implementation manner of this application scenario has been described in detail in the foregoing embodiment, and therefore no further description is provided herein.

Figure 6:
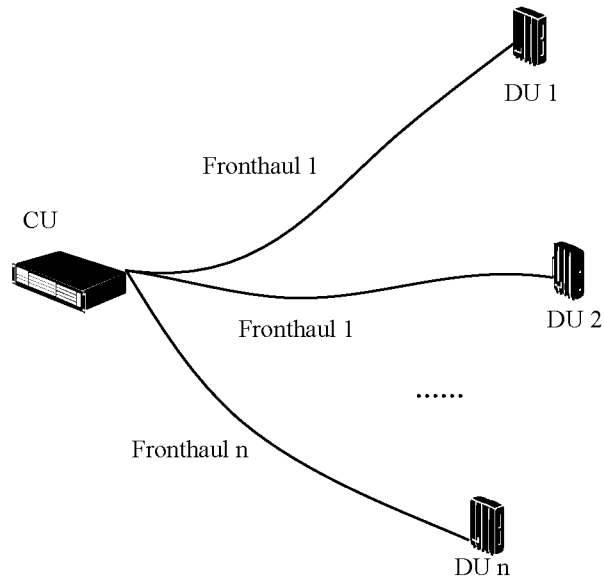
FIG. 6 is a schematic structural diagram of a C-RAN architecture in an embodiment.

In an application scenario of the CU-DU Network architecture, since network deployment using a central radio access network (C-RAN) architecture has become a popular network deployment scheme, this embodiment takes the C-RAN architecture as an example to explain an application of the information transmission method in the C-RAN architecture. FIG. 6 is a schematic structural diagram of the C-RAN architecture in an embodiment, the C-RAN architecture is divided into the CU and the DU, one CU may be connected to multiple DUs, where the CU is deployed in a core room, the DU is deployed in a radio coverage area, different DUs cover different areas, and the CU and the DU are connected through a fronthaul interface. In this application scenario, the first network node is a target DU and CU of the terminal device in the CU-DU network architecture, and the second network node is a source DU and CU of the terminal device in the CU-DU network architecture.

Figure 7:
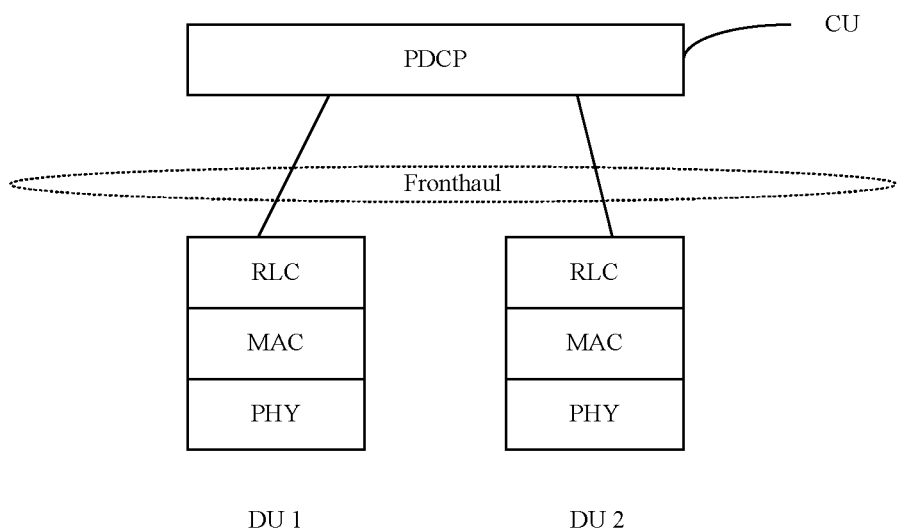
FIG. 7 is a schematic structural diagram of a CU-DU separate network architecture.
Figure 8:
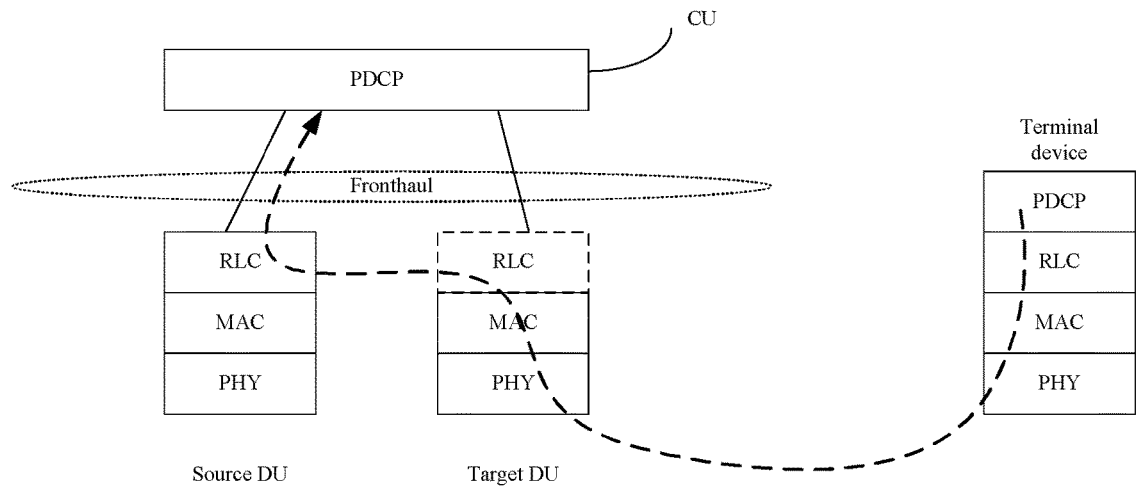
FIG. 8 is a schematic diagram of an application scenario in which the information transmission method provided in the embodiment of the present application is applied to the CU-DU separate network architecture.

In the discussion of a new radio (NR) access technology, a packet data convergence protocol (PDCP) layer of a protocol entity is placed in the CU, and a radio link control (RLC) layer, a media access control (MAC) layer, and a physical (PHY) layer are placed in the DU. FIG. 7 is a schematic structural diagram of a CU-DU separate network architecture. In the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. Two schemes may be adopted: one method is that the RLC layer remains in the source DU; another method is to newly establish a related bearer for the terminal device under a new node. The embodiment of the present application takes the RLC layer reserved in the source DU as an example, and describes a method for verifying the terminal device and the network device under the CU-DU separate network architecture. FIG. 8 is a schematic diagram of an application scenario in which the information transmission method provided in the embodiment of the present application is applied to the CU-DU separate network architecture, where the RLC is retained at a source side, i.e., the source DU.

Figure 9:
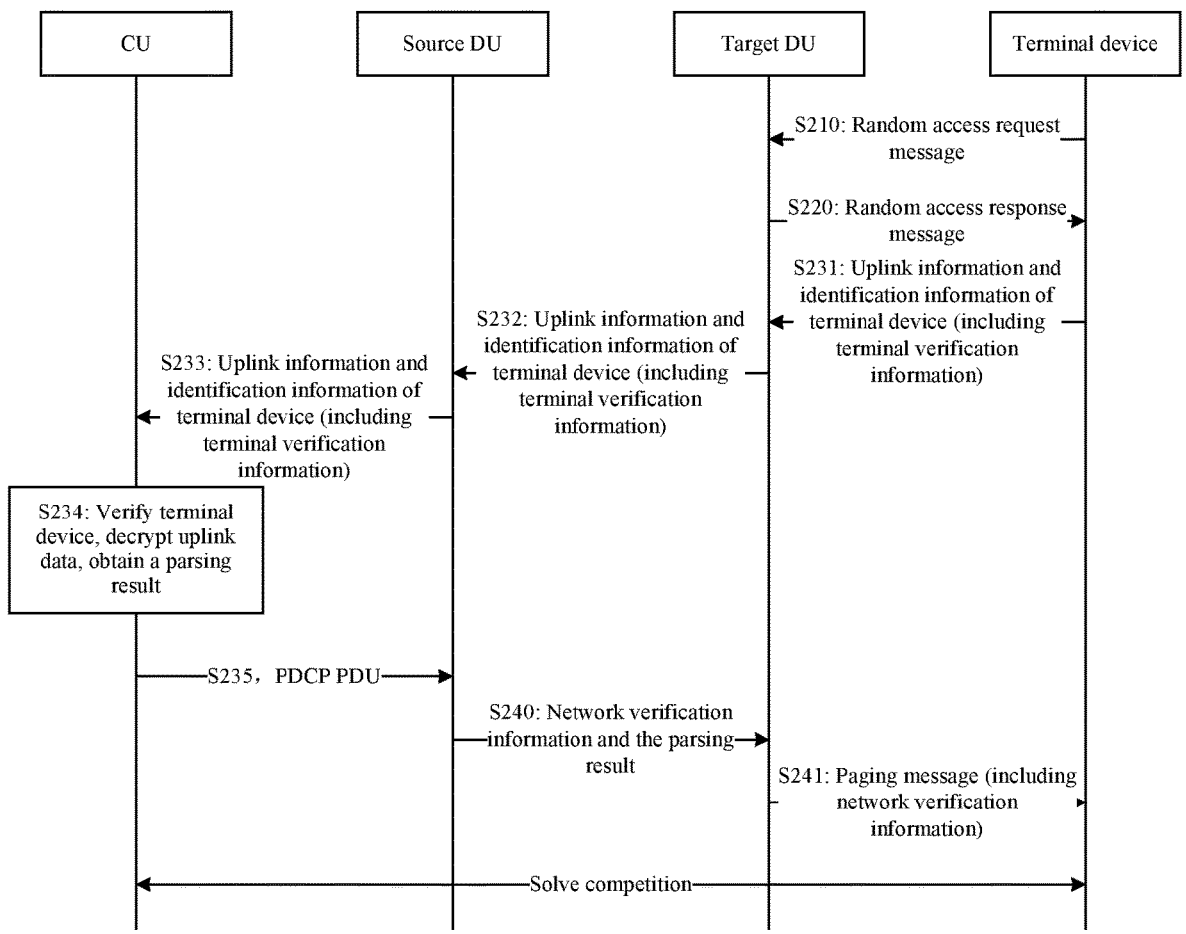
FIG. 9 is a flowchart of a signaling interaction of an information transmission method provided in an embodiment of the present application.

FIG. 9 is a flowchart of a signaling interaction of an information transmission method provided in an embodiment of the present application. The method provided in the embodiment of the present application is applied to the CU-DU separate network architecture, where a PDCP layer is disposed in the CU, and the RLC layer, the MAC layer and the PHY layer are disposed in the DU. The terminal device in the inactive state moves to a service area of a new DU (i.e., the target DU). There is an interface between the source DU and the target DU, and the common transmission channel (including a control signaling channel and a user plane data channel) is established between the source DU and the target DU and used for transmitting a data and control information for the terminal device in the inactive state to transmit data and control information. For the terminal device in the inactive state, the source DU and the target DU have default MAC layer and PHY layer configurations to support the terminal device to transmit uplink data in the inactive state, and the source DU retains RLC-related parameters and configurations of the terminal device. The method provided in the foregoing embodiment of the present application takes the four-step random access process in the LTE system as an example, and illustrates a manner in which when the terminal device in the inactive state moves out of the source DU and the uplink data reaches, the terminal device performs the uplink transmission, which may include steps described below.

In step S210, the target DU receives a random access request message sent by the terminal device.

The random access request message is mainly used for sending a random access preamble code through a designated resource; the designated resource may be a private resource or a resource in a common resource pool.

In step S220, the target DU sends a random access response message to the terminal device.

The random access response message may include, but is not limited to, the following information: a timing advance message (TA), an uplink scheduling grant message (UL Grant), terminal identification information (T-C-RNTI), and other auxiliary information (BI) and the like.

In step S231, the target DU receives uplink information sent by the terminal device and identification information of the terminal device, where the uplink information includes the uplink data and terminal verification information.

The uplink information may be of different information types in different application scenarios, and the uplink information may include: data+short MAC-I+resume ID, where the short MAC-I is a short media access control identification.

In step S232, the target DU sends the uplink information and the identification information of the terminal device to the RLC layer of the source DU through the GTP tunnel.

In step S233, the uplink information and the identification information of the terminal device are sent to the PDCP layer of the CU through the RLC layer of the source DU.

Since there is an interface between the source DU and the target DU and there is a common transmission channel arranged for data/control signaling transmission between the source DU and the target DU, the target DU may send the uplink message to the RLC layer of the source DU and send the uplink message to the PDCP layer of the CU through the RLC layer of the source DU. In addition, the channel for information transmission by the terminal device in the inactive state between the target DU and the source DU is common, such that a GTP-U related protocol is enhanced, that is, the target DU adds the identification information of the terminal device in the GTP-U protocol header, and the format may refer to the data structure shown in FIG. 5. The steps S231-S233 in the embodiment of the present embodiment achieve the same function as S130 in the above embodiment.

In one embodiment, since the RLC layer is kept in the source DU, that is, the format of a data packet of the interface between the target DU and the source DU is a service data unit (SDU) of the MAC layer (i.e., MAC SDU) or a protocol data unit (PDU) of the RLC layer (i.e., RLC PDU). Therefore, in the embodiment of the present application, interfaces and rules of a GPRS tunneling protocol user plane service data unit (GTP-U SDU) and RLC PDU are pre-configured in the CU-DU network architecture.

In step S234, the PDCP layer of the CU verifies the terminal device according to the terminal verification information, and decrypts the uplink data to obtain a parsing result.

In an application scenario where the uplink information reaches the terminal device, the above-mentioned uplink information includes the terminal verification information (for example, short MAC-I), and at the network side, the PDCP layer in the CU may verify the terminal device and decrypt the uplink data, thereby completing the verification of the terminal device by the network device.

In step S235, the PDCP layer of the CU is sent to a packet data convergence protocol (PDCP) protocol data unit (PDU) of the source DU and is sent to the UE through a CCCH, where the CCCH is common control signal channel.

In step S240, the target DU receives network verification information and the parsing result sent by the RLC layer of the source DU through the GTP tunnel, where the network verification information may also carry the identification information of the terminal device, and the network verification information may include a short/full MAC-I, security algorithm configuration information, and a next hop chaining count (NCC) and the like. The network verification information is sent in the form of the data packet, and for example is the packet data convergence protocol (PDCP) protocol data unit (PDU), and the short/full MAC-I is a short media access control identification/long media access control identification. The step S240 in the embodiment of the present application achieves the same function as the step S140 in the above-mentioned embodiment.

In step S241, the target DU sends a paging message including the network verification information to the terminal device, where the network verification information is used for the terminal device to verify the network device, such that the competition is solved.

In another possible implementation manner of the embodiment of the present application, the target DU may also send the network verification information in other manners, for example, the target DU sends the network verification information to the terminal device through a media access control layer control unit (MAC CE).

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, three manners may be adopted.

In a manner 1, the target DU receives, via the common transmission channel, parameter configuration information of the RLC layer sent by the RLC layer of the source DU.

In a manner 2, the target DU sets the parameter configuration information of the RLC layer of the target DU, the parameter configuration information of the RLC layer of the target DU is sent to the RLC layer of the source DU via the common transmission channel and sent to the CU through the RLC layer of the source DU, and after the target DU receives a determination instruction message sent by the RLC layer of the source DU, the parameter configuration information of the RLC layer is sent to the terminal device, where the determining instruction message is sent to the RLC layer of the source DU after the CU determines to use the parameter configuration information of the RLC layer.

Figure 10:
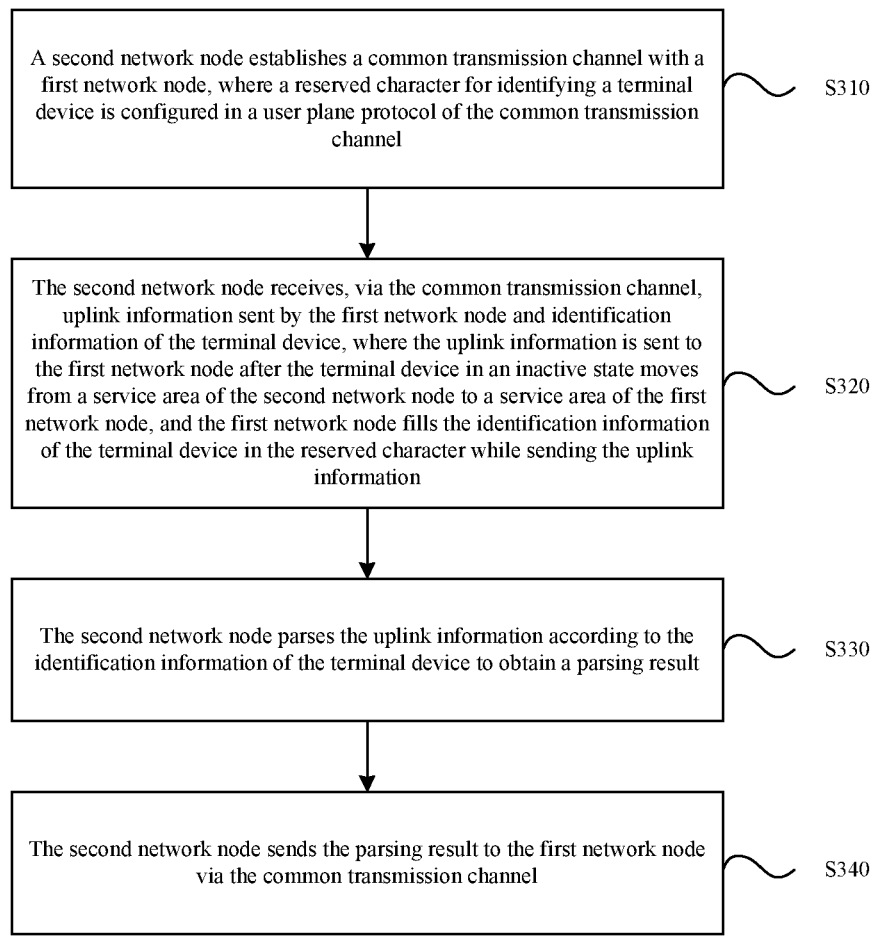
FIG. 10 is a flowchart of another information transmission method provided in an embodiment of the present application.

In a manner 3, the target DU sets the parameter configuration information of the RLC layer of the target DU, and sends the parameter configuration information of the RLC layer of the target DU to the terminal device through a media access control control element (MAC CE). FIG. 10 is a flowchart of another information transmission method provided in an embodiment of the present application. The information transmission method provided in this embodiment is applicable to the situation that the terminal device in the inactive state or the light connection state performs information transmission with the source serving base station after moving out of a service area of the source serving base station, and the method may be executed by an information transmission apparatus, where the information transmission apparatus is implemented by combining a hardware and a software, and the apparatus may be integrated in a processor of a second network node (i.e., a source serving base station) for the processor to invoke. As shown in FIG. 10, the method of this embodiment may include steps described below.

In step S310, the second network node establishes a common transmission channel with the first network node, where a reserved character for identifying the terminal device is configured in a user plane protocol of the common transmission channel.

The information transmission method provided in the embodiment of the present application is a method for transmitting information between the terminal device and the source serving base station. An application scenario of the embodiment of the present application is that: the terminal device in the inactive state or the light connection state moves out of the service area of the second network node and moves to a service area of the first network node. When uplink information of the terminal device reaches the second network node or the downlink data of the second network node reaches the terminal device, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on the GTP protocol. In this embodiment of the present application, the common transmission channel may be established between the first network node and the second network node, where the common transmission channel established between the first network node and the second network node is used for transmitting data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP user plane (GTP-U) protocol, and the reserved character is used to fill identification information of the terminal device in the subsequent information transmission.

In step S320, the second network node receives, via the common transmission channel, the uplink information sent by the first network node and the identification information of the terminal device, where the uplink information is sent to the first network node after the terminal device in an inactive state moves from a service area of the second network node to a service area of the first network node, and the first network node fills the identification information of the terminal device in the reserved character while sending the uplink information.

In this embodiment, since the terminal device has moved out of the service area of the second network node and enters the service area of the first network node, when the terminal device has uplink data to be transmitted, the first network node receives the uplink information (including uplink data/uplink control information) sent by the terminal device, and then the first network node may forward the uplink information to the second network node, and since the reserved character for identifying the terminal device has been configured in the user plane protocol of the common transmission channel in S310, the first network node may fill the identification information of the terminal device in the reserved character and send the identification information of the terminal device to the second network node while sending the uplink information.

In an embodiment, the identification information of the terminal device in this embodiment of the present application is filled in a GTP-U protocol header, that is, filled in the reserved character configured when the common transmission channel is established, for example, the identification information of the terminal device may be a resume ID or a truncated resume ID or other forms of UE-IDs, a data format of the GTP-U protocol header may be referred to FIG. 5. The first network node knows the source serving base station (i.e., the second network node) of the terminal device after receiving the uplink information of the terminal device. however, since the common transmission channel (i.e., the GTP tunnel) between the first network node and the second network node is common, if the second network node only receives the uplink information, it does not know which terminal device the uplink information is sent by, therefore, the first network node carries the identification information of the terminal device while sending the uplink information, and the identification information of the terminal device is used for instructing the second network node to correctly decode the uplink information.

In step S330, the second network node parses the uplink information according to the identification information of the terminal device to obtain a parsing result.

In step S340, the second network node sends the parsing result to the first network node via the common transmission channel.

In this embodiment, since the second network node (the source serving base station of the terminal device) has the context information of the terminal device, and the first network node carries the identification information of the terminal device whiling sending the uplink information to the second network node, the second network node may perform correct data parsing on the uplink information sent by the terminal device, after obtaining the parsing result, the second network node may also send the parsing result to the first network node (the base station of the terminal device that sends the uplink data) via the common transmission channel common to the first network node, and the first network node receives the uplink information sent by the terminal device. At this time, the transmission task of the uplink information of the terminal device is completed.

The difference between the information transmission method provided in the embodiment of the present application and the related technology mainly lies in: in a manner that the terminal device in the inactive state in the LTE system of the related art carries out uplink information transmission after moving out of the source base station, the target base station requests the source base station for related information such as context of the terminal device and the like, which is time consuming and causes a large network delay. In the information transmission method provided in the embodiment of the present application, for the terminal device in the light connection state in the standardization process of the LTE R14 and in the inactive state in the 5G system, when the uplink information of the terminal device reaches, after the first network node (i.e., the target base station) receives the uplink information, the first network node sends the uplink information to the second network node (i.e., the source base station), and the uplink information may be sent via the common transmission channel established between the first network node and the second network node. Since the reserved character for identifying the terminal device is configured in the user plane protocol of the common transmission channel, when the first network node may fill the identification information of the terminal device in the reserved character upon receiving the uplink information, namely the identification information of the terminal device is simultaneously sent, such that the second network node knows the terminal device sending the uplink information after receiving the uplink information, whereby the uplink information is parsed in a correct way, and then the parsing result is fed back to the first network node. The information transmission method provided in the embodiment of the present application saves the process that the first network node requests the second network node for the context information of the terminal device, saves the signaling overhead, and is beneficial to reduce the network delay of a parsing data.

In the information transmission method provided in the embodiment of the present application, by means of the common transmission channel established between the first network node and the second network node and of the reserved character configured in the user plane protocol of the common transmission channel and used for identifying the terminal device, after the first network node receives uplink information sent by the terminal device that moves out of the service area of the second network node, the first network node sends the uplink information and the identification information of the terminal device to the source serving base station (i.e., a second network node) of the terminal device via the common transmission channel, and then, the first network node may receive, via the common transmission channel, the parsing result obtained by parsing the uplink information by the second network node.

The information transmission method provided in the embodiment of the present application is not only applicable to a traditional integrated base station, but also applicable to a CU-DU network architecture.

In an application scenario of the integrated base station, the first network node is the target base station of the terminal device, and the second network node is the source base station of the terminal device. The implementation manner of this application scenario has been described in detail in the foregoing embodiment, and therefore no further description is provided herein.

In an application scenario of the CU-DU network architecture, reference is made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission method applied to the CU-DU separate network architecture according to the embodiment of the present application may be shown in FIG. 8 (where the RLC is retained at a source side, i.e., the source DU).

In an example of the present application, the implementation manner of S320 may include:

the RLC layer of the source DU receives, via the common transmission channel, the uplink information sent by the target DU and the identification information of the terminal device; and the RLC layer of the source DU sends the uplink information and the identification information of the terminal device to the PDCP layer of the CU.

Since there is an interface between the source DU and the target DU and there is a common transmission channel used for data/control signaling transmission between the source DU and the target DU, the target DU may send the uplink message to the RLC layer of the source DU and send the uplink message to the PDCP layer of the CU through the RLC layer of the source DU. In addition, the channel for information transmission by the terminal device in the inactive state between the target DU and the source DU is common, such that a GTP-U related protocol is enhanced, that is, the target DU adds the identification information of the terminal device in the GTP-U protocol header, and the format may refer to the data structure shown in FIG. 5.

In one embodiment, since the RLC layer is kept in the source DU, that is, the format of the data packet that transmitted by the target DU to the source DU via the interface between the target DU and the source DU is a MAC SDU or RLC PDU. Therefore, in the embodiment of the present application, interfaces and rules of a GTP-U SDU and a RLC PDU are pre-configured in the CU-DU network architecture.

The implementation manner of S330 may include: the PDCP layer of the CU parses the uplink information according to the identification information of the terminal device and sends a parsing result to the source DU, namely the source DU receives the parsing result sent by the PDCP layer of the CU, and the parsing result is obtained from parsing the uplink information by the PDCP layer of the CU according to the identification information of the terminal device.

The implementation manner of the S340 may include: the source DU sends the parsing result to the target DU via the common transmission channel.

When the method provided in the embodiment of the present application is adopted in an application scenario of the CU-DU network architecture for the uplink information transmission, the signaling interaction manner of the source DU, the target DU, and the CU may refer to the flowchart shown in FIG. 9, and the implementation manner is described in detail in the above embodiment, and therefore no further description is provided herein.

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, The method provided in the embodiment of the present application may further include: the RLC layer of the source DU sends the parameter configuration information of the RLC layer to the target DU via the common transmission channel.

Figure 11:
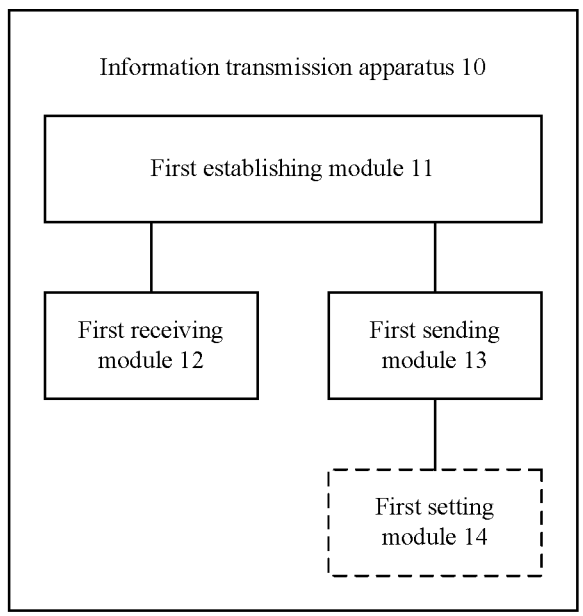
FIG. 11 is a schematic structural diagram of an information transmission apparatus provided in an embodiment of the present application.

FIG. 11 is a schematic structural diagram of an information transmission apparatus provided in an embodiment of the present application. The information transmission method provided in this embodiment is applicable to the situation that the terminal device in the inactive state or the light connection state performs information transmission with the source serving base station after moving out of a service area of the source serving base station, and the method may be executed by an information transmission apparatus, where the information transmission apparatus is implemented by combining a hardware and a software, and the apparatus may be integrated in a processor of a first network node (i.e., a target serving base station) for the processor to invoke. As shown in FIG. 11, the information transmission apparatus 10 of the present embodiment may include a first establishing module 11, a first receiving module 12 and a first sending module 13.

The first establishing module 11 is configured to establish the common transmission channel with the second network node, where a reserved character for identifying the terminal device is configured in the user plane protocol of the common transmission channel.

The information transmission apparatus provided in the embodiment of the present application is configured to perform information transmission between the terminal device and the source serving base station. An application scenario of the embodiment of the present application is that: the terminal device in the inactive state or the light connection state moves out of the service area of the second network node and moves to a service area of the first network node, when uplink information of the terminal device reaches the second network node or the downlink data of the second network node reaches the terminal device, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a GTP protocol. The first establishing module 11 in this embodiment of the present application may establish the common transmission channel between the first network node and the second network node, although the common transmission channel established between the first network node and the second network node is configured to transmit data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP-U protocol, and the reserved character is used to fill identification information of the terminal device in the subsequent information transmission.

The first receiving module 12 is configured to receive the uplink information sent by the terminal device, where the terminal device moves from a service area of a second network node to a service area of a first network node and is in an inactive state.

The first sending module 13 is configured to send the uplink information and the identification information of the terminal device to the second network node via the common transmission channel, where the first network node fills the identification information of the terminal device in the reserved character while sending the uplink information.

In this embodiment, since the terminal device has moved out of the service area of the second network node and enters the service area of the first network node, when the terminal device has uplink data to be transmitted, the first receiving module 12 of the first network node receives the uplink information (including uplink data/uplink control information) sent by the terminal device, and the first sending module may forward the uplink information to the second network node, and since the first establishing module 11 has configured a reserved character configured to identify the terminal device in the user plane protocol upon establishing the common transmission channel, the first sending module may fill the identification information of the terminal device in the reserved character and send the identification information of the terminal device to the second network node while sending the uplink information.

In an embodiment, the identification information of the terminal device in this embodiment of the present application is filled in a GTP-U protocol header, that is, filled in the reserved character configured when the common transmission channel is established, for example, the identification information of the terminal device may be a resume ID or a truncated resume ID or other forms of terminal equipment identifiers (UE-IDs), a data format of the GTP-U protocol header may be referred to FIG. 5. The first receiving module 12 of the first network node knows the source serving base station (i.e., the second network node) of the terminal device after receiving the uplink information of the terminal device, however, since the common transmission channel (i.e., the GTP tunnel) between the first network node and the second network node is common, if the second network node only receives the uplink information, it does not know which terminal device the uplink information is sent by, therefore, the first sending module 13 carries the identification information of the terminal device while sending the uplink information, and the identification information of the terminal device is used for instructing the second network node to correctly decode the uplink information.

The first receiving module 12 is further configured to receive, via the common transmission channel, a parsing result obtained by parsing the uplink information by the second network node, where the parsing result is obtained from parsing the uplink information by the second network node according to the identification information of the terminal device.

In this embodiment, since the second network node (the source serving base station of the terminal device) has the context information of the terminal device, and the first network node carries the identification information of the terminal device whiling sending the uplink information to the second network node, the second network node may perform correct data parsing on the uplink information sent by the terminal device, the second network node may also send the parsing result to the first network node (the base station of the terminal device that sends the uplink data) via the common transmission channel common to the first network node after obtaining the parsing result, and the first receiving module 12 receives the uplink information sent by the terminal device. At this time, the transmission task of the uplink information of the terminal device is completed.

The information transmission apparatus provided in the embodiment of the present application is configured to execute the information transmission method shown in FIG. 4 in the embodiment of the present application, and has a corresponding functional module, and the implementation principle and technical effect thereof are similar to the previous implementation principle and technical effect, and thus no further description is provided herein.

The information transmission method provided in the embodiment of the present application is not only applicable to a traditional integrated base station, but also applicable to a CU-DU network architecture.

In an application scenario of the integrated base station, the first network node is the target base station of the terminal device, and the second network node is the source base station of the terminal device. The implementation manner of this application scenario has been described in detail in the foregoing embodiment, and therefore no further description is provided herein.

In an application scenario of the CU-DU network architecture, reference is made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission apparatus applied to the CU-DU separate network architecture according to the embodiment of the present application may also be shown in FIG. 8 (where the RLC is retained at a source side, i.e., the source DU).

In this embodiment of the present application, an implementation manner in which the first sending module 13 sends the uplink information and the identification information of the terminal device to the second network node via the common transmission channel may include: the first sending module 13 is configured such that the target DU sends the uplink information and the identification information of the terminal device to the radio link layer control protocol (RLC) layer of the source DU via the common transmission channel, and send the uplink information and the identification information of the terminal device to the PDCP layer of the CU through the RLC layer of the source DU.

The implementation manner of the first receiving module 12 receiving the parsing result of the uplink information parsed by the second network node via the common transmission channel may include: the first receiving module 12 is configured such that the target DU receives a parsing result sent by the source DU via the common transmission channel, where the parsing result is obtained from parsing the uplink information by the PDCP layer of the CU, and send the uplink information to the RLC layer of the source DU through the PDCP layer of the CU.

In this embodiment, since the channel for information transmission between the target DU and the source DU for the terminal device in the inactive state is common, the GTP-U related protocol is enhanced, that is, the target DU adds the identification information of the terminal device in the GTP-U protocol header, and the format may also refer to the data structure shown in FIG. 5. In addition, since the RLC layer is kept in the source DU, that is, the format of the data packet that transmitted by the target DU to the source DU via the interface between the target DU and the source DU is a MAC SDU or RLC PDU, in the embodiment of the present application, the interfaces and rules of the GTP-U SDU and the RLC PDU are pre-configured in the CU-DU network architecture.

In the scenario of applying the embodiment of the present application to a CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, three manners may be adopted.

In a manner 1, the first receiving module 12 is further configured such that the target DU receives, via the common transmission channel established by the first establishing module 11, parameter configuration information of the RLC layer sent by the RLC layer of the source DU.

In a manner 2, the apparatus provided in the embodiment of the present application may further include a first setting module 14 and a first sending module.

The first setting module 14 is configured such that the target DU sets the parameter configuration information of the RLC layer of the target DU.

The first sending module 13 is further configured such that the target DU sends, via the common transmission channel, the parameter configuration information of the RLC layer set by the first setting module 14 to the RLC layer of the source DU, and sends the parameter configuration information to the CU through the RLC layer of the source DU; the first sending module 13 is further configured such that send the parameter configuration information of the RLC layer to the terminal device after the target DU receives a determination instruction message sent by the RLC layer of the source DU; where the determining instruction message is sent to the RLC layer of the source DU after the CU determines to use the parameter configuration information of the RLC layer.

In a manner 3, the first setting module 14 is configured such that the target DU sets the parameter configuration information of the RLC layer of the target DU.

The first sending module 13 is further configured such that the target DU sends the parameter configuration information of the RLC layer set by the first setting module 14 to the terminal device through the MAC CE.

In practical applications, the first receiving module 12 and the first sending module 13 in the above-mentioned embodiment shown in FIG. 11 of the present application may be implemented by a transceiver of the first network node, and the first establishing module 11 and the first setting module 14 may be implemented by a processor of the first network node, where the processor may be, for example, a central processing unit (CPU), or an application specific integrated circuit (ASIC), or one or more integrated circuits implementing the embodiments of the present application.

Figure 12:
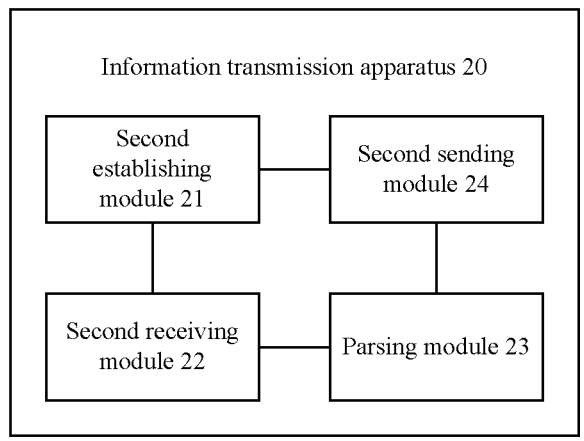
FIG. 12 is a schematic structural diagram of another information transmission apparatus provided in an embodiment of the present application.

FIG. 12 is a schematic structural diagram of another information transmission apparatus provided in an embodiment of the present application. The information transmission apparatus provided in this embodiment is applicable to the situation that the terminal device in the inactive state or the light connection state performs information transmission with the source serving base station after moving out of a service area of the source serving base station, where the information transmission apparatus is implemented by combining a hardware and a software, and the apparatus may be integrated in a processor of a second network node (i.e., a source serving base station) for the processor to invoke. As shown in FIG. 12, the information transmission apparatus 20 provided in the embodiment of the present application may include a second establishing module 21, a second receiving module 22, a parsing module 23 and a second sending module 24.

The second establishing module 21 is configured to establish the common transmission channel with the first network node, where a reserved character for identifying the terminal device is configured in a user plane protocol of the common transmission channel.

The information transmission apparatus provided in the embodiment of the present application is configured to perform information transmission between the terminal device and the source serving base station. An application scenario of the embodiment of the present application is that: the terminal device in the inactive state or the light connection state moves out of the service area of the second network node and moves to a service area of the first network node, when uplink information of the terminal device reaches the second network node or the downlink data of the second network node reaches the terminal device, at this time, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a GTP protocol. The second establishing module 21 in this embodiment of the present application may establish the common transmission channel between the first network node and the second network node, although the common transmission channel established between the first network node and the second network node is configured to transmit data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP-U protocol, and the reserved character is used to fill identification information of the terminal device in the subsequent information transmission.

The second receiving module 22 is configured to receive, via the common transmission channel established by the second establishing module 21, uplink information and identification information of the terminal device, where the uplink information is sent to the first network node after the terminal device in the inactive state moves from the service area of the second network node to the service area of the first network node.

In this embodiment, since the terminal device has moved out of the service area of the second network node and enters the service area of the first network node, when the terminal device has uplink data to be transmitted, the first network node receives the uplink information (including uplink data/ uplink control information) sent by the terminal device, and then the first network node may forward the uplink information to the second network node, and since the second establishing module 21 has configured a reserved character configured to identify the terminal device in the user plane protocol upon establishing the common transmission channel, the first sending module may fill the identification information of the terminal device in the reserved character and send the identification information of the terminal device to the second network node while sending the uplink information, and thus the second receiving module 22 receives the uplink information and identification information of the terminal device.

The parsing module 23 is configured such that the second network node parses the uplink information according to the identification information of the terminal device received by the second receiving module 22, so as to obtain a parsing result.

The second sending module 24 is configured to send the parsing result obtained by the parsing module 23 to the first network node via the common transmission channel established by the second establishing module 21.

In this embodiment, since the second network node (the source serving base station of the terminal device) has the context information of the terminal device, and the first network node carries the identification information of the terminal device whiling sending the uplink information to the second network node, the parsing module 23 of the second network node may perform correct data parsing on the uplink information sent by the terminal device, after obtaining the parsing result, the second sending module 24 may send the parsing result to the first network node (the base station of the terminal device that sends the uplink data) via the common transmission channel common to the first network node, and the first network node receives the uplink information sent by the terminal device. At this time, the transmission task of the uplink information of the terminal device is completed.

The information transmission apparatus provided in the embodiment of the present application is configured to execute the information transmission method shown in FIG. 10 in the embodiment of the present application, and has a corresponding functional module, and the implementation principle and technical effect thereof are similar to the previous implementation principle and technical effect, and thus no further description is provided herein.

The information transmission method provided in the embodiment of the present application is not only applicable to a traditional integrated base station, but also applicable to a CU-DU network architecture.

In an application scenario of the integrated base station, the first network node is the target base station of the terminal device, and the second network node is the source base station of the terminal device. The implementation manner of this application scenario has been described in detail in the foregoing embodiment, and therefore no further description is provided herein.

In an application scenario of the CU-DU network architecture, reference is also made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission apparatus applied to the CU-DU separate network architecture according to the embodiment of the present application may also be shown in FIG. 8 (where the RLC is retained at a source side, i.e., the source DU).

In this embodiment of the present application, an implementation manner in which the second network node receives the uplink information and the identification information of the terminal device, which are sent by the first network node, via the common transmission channel may include the second receiving module 22 and the second sending module 24.

The second receiving module 22 is configured such that the RLC layer of the source DU receives the uplink information and the identification information of the terminal device sent by the target DU via the common transmission channel.

The second sending module 24 is configured such that the RLC layer of the source DU send the uplink information and the identification information of the terminal device to the PDCP layer of the CU.

In this embodiment, since the channel for information transmission between the target DU and the source DU for the terminal device in the inactive state is common, the GTP-U related protocol is enhanced, that is, the target DU adds the identification information of the terminal device in the GTP-U protocol header, and the format may also refer to the data structure shown in FIG. 5. In addition, since the RLC layer is kept in the source DU, that is, the format of the data packet that transmitted by the target DU to the source DU via the interface between the target DU and the source DU is a MAC SDU or a RLC PDU, in the embodiment of the present application, the interfaces and rules of the GTP-U SDU and the RLC PDU are pre-configured in the CU-DU network architecture.

The implementation manner in which the parsing module 23 parses the uplink information according to the identification information of the terminal device may include: the parsing module 23 is configured such that the PDCP layer of the CU parses the uplink information according to the identification information of the terminal device and sends a parsing result to the source DU.

The implementation manner in which the second sending module 24 sends the parsing result to the first network node via the common transmission channel may include: the second sending module 24 is further configured such that the source DU sends the parsing result to the target DU via the common transmission channel.

In the scenario of applying the embodiment of the present application to a CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, in the apparatus provided by the embodiment of the present application:

the second sending module 24 is further configured such that the RLC layer of the source DU sends the parameter configuration information of the RLC layer to the target DU via the common transmission channel established by the second establishing module 21.

In practical applications, the second receiving module 22 and the second sending module 24 in the above-mentioned embodiment shown in FIG. 12 of the present application may be implemented by a transceiver of the second network node, and the second establishing module 21 and the parsing module 23 may be implemented by a processor of the second network node, where the processor may be, for example, a central processing unit (CPU), or an application specific integrated circuit (ASIC), or one or more integrated circuits implementing the embodiments of the present application.

The information transmission method and apparatus described in the above embodiments are of such implementation manner in which the terminal device in the inactive state or the light connection state and moving from the service area of the source server base station to the service area of the target server base station sends the uplink information, and an implementation manner in which the terminal device in the inactive state or the light connection state and moving out of the second network node receives the downlink information sent by the source server base station will be described below.

Figure 13:
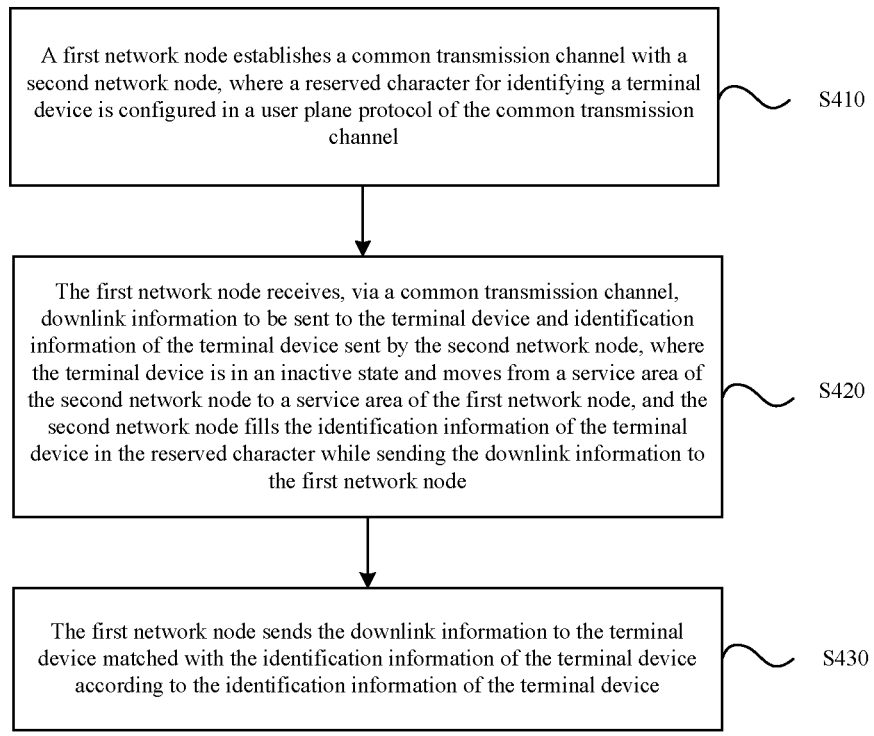
FIG. 13 is a flowchart of still another information transmission method provided in an embodiment of the present application.

FIG. 13 is a flowchart of still another information transmission method provided in an embodiment of the present application. The information transmission apparatus provided in this embodiment is applicable to the situation that the terminal device in the inactive state or the light connection state performs information transmission with the source serving base station after moving out of the source serving base station, where this method may be performed by the information transmission apparatus, the information transmission apparatus is implemented by combining a hardware and a software, and the apparatus may be integrated in a processor of a first network node (i.e., a target serving base station) for the processor to invoke. As shown in FIG. 13, the method of the present embodiment may include steps described below.

In step S410, the first network node establishes a common transmission channel with the second network node, where a reserved character for identifying the terminal device is configured in a user plane protocol of the common transmission channel.

The information transmission method provided in the embodiment of the present application is a method for transmitting information between the terminal device and the source serving base station. An application scenario of the embodiment of the present application is that: the terminal device in the inactive state or the light connection state moves out of the service area of the second network node and moves to a service area of the first network node. When uplink information of the terminal device reaches the second network node or the downlink data of the second network node reaches the terminal device, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a general packet radio service (GPRS) protocol. In this embodiment of the present application, the common transmission channel may be established between the first network node and the second network node, where the common transmission channel established between the first network node and the second network node is configured to transmit data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP user plane (GTP-U) protocol, and the reserved character is used to fill identification information of the terminal device in the subsequent information transmission.

In step S420, the first network node receives, via a common transmission channel, downlink information to be sent to the terminal device and identification information of the terminal device sent by the second network node, where the terminal device is in an inactive state and moves from a service area of the second network node to a service area of the first network node, and the second network node fills the identification information of the terminal device in the reserved character while sending the downlink information to the first network node.

In step S430, the first network node sends the downlink information to the terminal device matched with the identification information of the terminal device according to the identification information of the terminal device.

In this embodiment of the present application, since the terminal device has moved out of the service area of the second network node and enters the service area of the first network node, when the second network node has downlink data to be transmitted, the downlink information (including downlink data/downlink control information) is sent to the first network node that establishes a connection with the terminal device, and meanwhile, the identification information of the terminal device is sent to the first network node, where the first network node may send the downlink information to the designated terminal device according to the identification information of the terminal device, and since the reserved character for identifying the terminal device has been configured in the user plane protocol of the common transmission channel in S410, the second network node may fill the identification information of the terminal device in the reserved character and send the identification information of the terminal device to the first network node while sending the downlink information.

In the embodiment of the present application, the identification information of the terminal device is filled in a GTP-U protocol header, that is, is filled in the reserved character configured when the common transmission channel is established above, for example, the identification information of the terminal device may be a resume ID, a truncated resume ID or other forms of terminal equipment identifiers (UE-IDs), a data format of the GTP-U protocol header may be referred to FIG. 5. The first network node knows the target terminal device to which the downlink information is to be sent after receiving the downlink information sent by the second network node, however, since the common transmission channel (i.e., a GTP tunnel) between the first network node and the second network node is common, if the first network node only receives the downlink information, it does not know which terminal device the downlink information is sent to, therefore, the second network node carries the identification information of the terminal device while sending the downlink information, and the identification information of the terminal device is configured to instruct the first network node to forward the downlink information to the correct terminal device.

The information transmission method provided in the embodiment of the present application is applied to a case of downlink sending, and also for the terminal device in the light connection state in the standardization process of the LTE R14 and in the inactive state in the 5G system, when the downlink information of the source base station (i.e., the second network node) is transmitted, the downlink data is sent to the first network node (i.e., the target base station) that establishes a connection with the terminal device, and is sent via the common transmission channel established between the first network node and the second network node. Since the reserved character for identifying the terminal device is configured in the user plane protocol of the common transmission channel, the second network node may fill the identification information of the terminal device in the reserved character upon sending the downlink information, namely the identification information of the terminal device is simultaneously sent, such that the first network node may know to which terminal device the downlink information is sent after receiving the downlink information, and thus correctly send the downlink information.

In the information transmission method provided in the embodiment of the present application, by means of the common transmission channel established between the first network node and the second network node and of the reserved character configured in the user plane protocol of the common transmission channel and used for identifying the terminal device, after the second network node has downlink information for the terminal device that moves out of the service area of the second network node, the second network node sends the downlink information together with the identification information of the terminal device to the target serving base station (i.e., the first network node) of the terminal device via the common transmission channel, and the first network node may send the downlink information to the designated terminal device according to the identification information of the terminal device. The method provided in the embodiment of the present application may be applied to a case that the base station carries out downlink sending by means of the common transmission channel established between the base stations and of the relevant configuration of the user plane protocol, and the method provided in the embodiment of the present application has a higher practicability in an application scenario where the terminal device in the inactive state or the light connection state receives the downlink information.

The information transmission method provided in the embodiment of the present application is not only applicable to a traditional integrated base station, but also applicable to a CU-DU network structure.

In an application scenario of the integrated base station, the first network node is the target base station of the terminal device, and the second network node is the source base station of the terminal device. The implementation manner of this application scenario has been described in detail in the foregoing embodiment, and therefore no further description is provided herein.

In an application scenario of the CU-DU network architecture, reference is made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission method applied to the CU-DU separate network architecture according to the embodiment of the present application may be shown in FIG. 8 (where the RLC is retained at a source side, i.e., the source DU).

Figure 14:
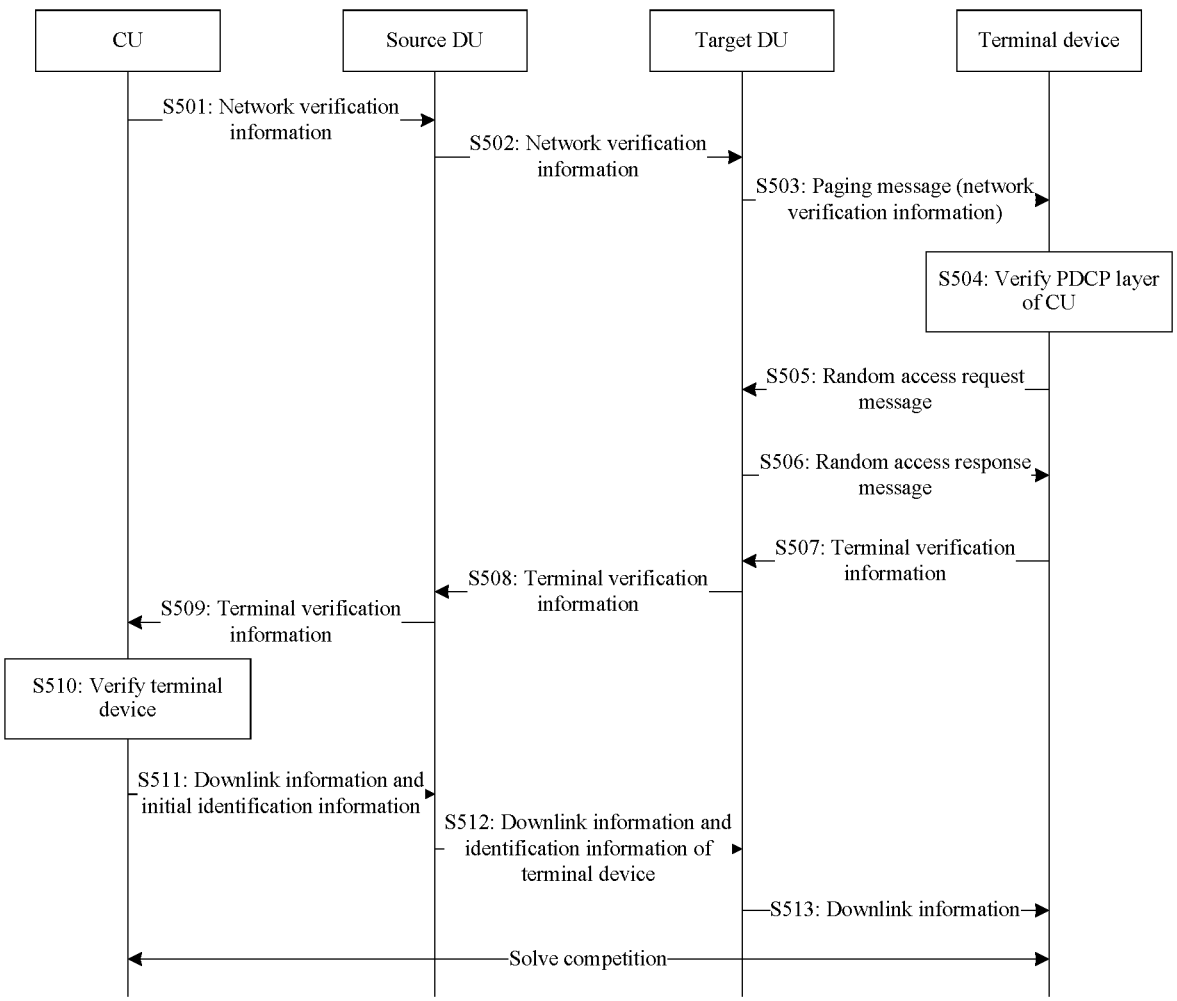
FIG. 14 is a flowchart of a signaling interaction of another information transmission method provided in an embodiment of the present application.

FIG. 14 is a flowchart of a signaling interaction of another information transmission method provided in an embodiment of the present application. The method provided in the embodiment of the present application is applied to the CU-DU separate network architecture, where a PDCP layer is disposed in the CU, and the RLC layer, the MAC layer and the PHY layer are disposed in the DU. The terminal device in the inactive state moves to a service area of a new DU (i.e., the target DU). There is an interface between the source DU and the target DU, and a common transmission channel (including a control signaling channel and a user plane data channel) is established between the source DU and the target DU and configured to transmit a data and control information for the terminal device in the inactive state. For the terminal device in the inactive state, the source DU and the target DU have default MAC layer and PHY layer configurations to support the terminal device to receive downlink data in the inactive state, and the source DU retains RLC-related parameters and configurations of the terminal device. The method provided in the foregoing embodiment of the present application takes the four-step random access process in the LTE system as an example, and illustrates a manner in which when the terminal device in the inactive state moves out of the source DU and the downlink data is transmitted, the terminal device performs the downlink transmission, which may include steps described below.

In step S501, the PDCP layer of the CU sends network verification information to a source DU, where the network verification information includes for example a short/full MAC-I, security algorithm configuration information, a NCC and the like, and the network verification information is sent in the form of a data packet, and for example is the PDCP protocol data unit (PDU).

In step S502, the source DU sends network verification information to the target DU via the common transmission channel, where the resume ID of the terminal device is carried in this information.

In step S503, the target DU sends a paging message including the network verification information to the terminal device, where the network verification information is used to verify the network device by the terminal device, such that competition is solved.

In step S504, the terminal device verifies the PDCP layer of the CU according to the network verification information.

In step S505, the target DU receives a random access request message sent by the terminal device.

The random access request message is mainly used for sending a random access preamble code through a designated resource; the designated resource may be a private resource or a resource in a common resource pool.

In step S506, the target DU sends a random access response message to the terminal device.

In step S507, the target DU receives terminal verification information sent by the terminal device.

In step S508, the target DU sends the terminal verification information to the RLC layer of the source DU through the GTP tunnel.

In step S509, the RLC layer of the source DU sends the terminal verification information to the PDCP layer of the CU.

Since there is an interface between the source DU and the target DU and there is a common transmission channel arranged for data/control signaling transmission between the source DU and the target DU, the target DU may send the terminal verification information to the RLC layer of the source DU and send the terminal verification information to the PDCP layer of the CU through the RLC layer of the source DU. In addition, the channel for information transmission by the terminal device in the inactive state between the target DU and the source DU is common, such that a GTP-U related protocol is enhanced, that is, the target DU adds the identification information of the terminal device in the GTP-U protocol header, and the format may refer to the data structure shown in FIG. 5.

In one embodiment, since the RLC layer is kept in the source DU, that is, the format of a data packet of the interface between the target DU and the source DU is a service data unit (SDU) of the MAC layer (i.e., MAC SDU) or a PDU of the RLC layer (i.e., RLC PDU). Therefore, in the embodiment of the present application, interfaces and rules of a GTP-U SDU and a RLC PDU are pre-configured in the CU-DU network architecture.

In step S510, the PDCP layer of the CU verifies the terminal device according to the terminal verification information.

In step S511, the PDCP layer of the CU sends downlink information and initial identification information to the RLC layer of the source DU, where the initial identification information is set as a target terminal for indicating the downlink information, the format of the data packet is, for example, a packet data convergence protocol (PDCP) protocol data unit (PDU).

In step S512, the target DU receives the downlink information and the identification information of the terminal device sent by the RLC layer of the source DU through the GTP tunnel, where the identification information of the terminal device is obtained by processing the initial identification information by the source DU.

In step S513, the target DU sends the downlink information to the designated terminal device according to the identification information of the terminal device.

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, three manners may be adopted.

In a manner 1, the target DU receives, via the common transmission channel, parameter configuration information of the RLC layer sent by the RLC layer of the source DU.

In a manner 2, the target DU sets the parameter configuration information of the RLC layer of the target DU, the parameter configuration information of the RLC layer of the target DU is sent to the RLC layer of the source DU via the common transmission channel and sent to the CU through the RLC layer of the source DU, and after the target DU receives a determination instruction message sent by the RLC layer of the source DU, the parameter configuration information of the RLC layer is sent to the terminal device, where the determining instruction message is sent to the RLC layer of the source DU after the CU determines to use the parameter configuration information of the RLC layer.

In a manner 3, the target DU sets the parameter configuration information of the RLC layer of the target DU, and sends the parameter configuration information of the RLC layer of the target DU to the terminal device through a MAC CE.

Figure 15:
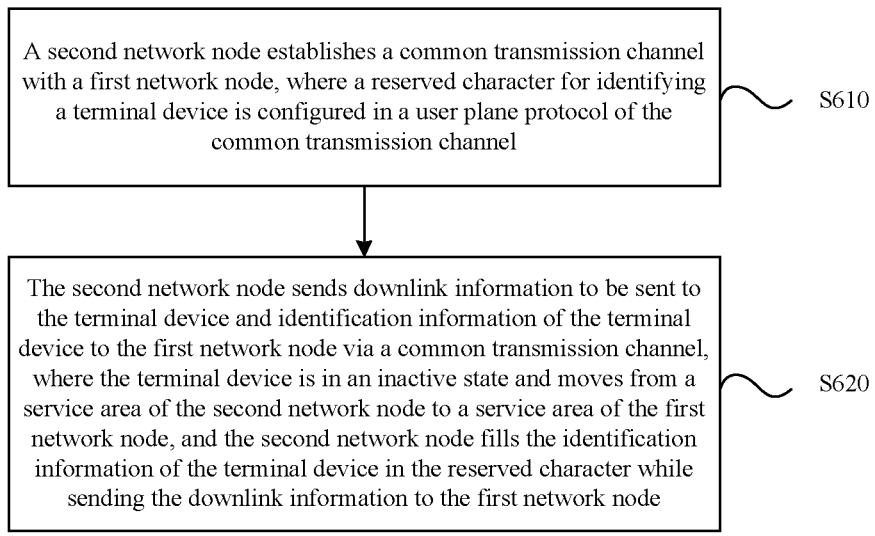
FIG. 15 is a flowchart of yet another information transmission method provided in an embodiment of the present application.

FIG. 15 is a flowchart of yet another information transmission method provided in an embodiment of the present application. The information transmission method provided in this embodiment is applicable to the situation that the terminal device in the inactive state or the light connection state performs information transmission with the source serving base station after moving out of a service area of the source serving base station, and the method may be executed by an information transmission apparatus, where the information transmission apparatus is implemented by combining a hardware and a software, and the apparatus may be integrated in a processor of a second network node (i.e., a source serving base station) for the processor to invoke. As shown in FIG. 15, the method of this embodiment may include steps described below.

In step S610, the second network node establishes a common transmission channel with the first network node, where a reserved character for identifying the terminal device is configured in a user plane protocol of the common transmission channel.

The information transmission method provided in the embodiment of the present application is a method for transmitting information between the terminal device and the source serving base station. An application scenario of the embodiment of the present application is that: the terminal device in the inactive state or the light connection state moves out of the service area of the second network node and moves to a service area of the first network node. When uplink information of the terminal device reaches the second network node or the downlink data of the second network node reaches the terminal device, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on the GTP protocol. In this embodiment of the present application, the common transmission channel may be established between the first network node and the second network node, where the common transmission channel established between the first network node and the second network node is used for transmitting data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP user plane (GTP-U) protocol, and the reserved character is used to fill identification information of the terminal device in the subsequent information transmission.

In step S620, the second network node sends downlink information to be sent to the terminal device and identification information of the terminal device to the first network node via a common transmission channel, where the terminal device is in an inactive state and moves from a service area of the second network node to a service area of the first network node, and the second network node fills the identification information of the terminal device in the reserved character while sending the downlink information to the first network node.

In this embodiment of the present application, since the terminal device has moved out of the service area of the second network node and enters the service area of the first network node, when the second network node has downlink data to be transmitted, the downlink information (including downlink data/downlink control information) is sent to the first network node that establishes a connection with the terminal device, and meanwhile, the identification information of the terminal device is sent to the first network node, where the first network node may send the downlink information to the designated terminal device according to the identification information of the terminal device, and since the reserved character for identifying the terminal device has been configured in the user plane protocol of the common transmission channel in S610, the second network node may fill the identification information of the terminal device in the reserved character and send the identification information of the terminal device to the first network node while sending the downlink information.

In the embodiment of the present application, the identification information of the terminal device is filled in a GTP-U protocol header, that is, is filled in the reserved character configured when the common transmission channel is established above, for example, the identification information of the terminal device may be a resume ID, a truncated resume ID or other forms of UE-IDs, a data format of the GTP-U protocol header may be referred to FIG. 5. The first network node knows the target terminal device to which the downlink information is to be sent after receiving the downlink information sent by the second network node, however, since the common transmission channel (i.e., a GTP tunnel) between the first network node and the second network node is common, if the first network node only receives the downlink information, it does not know which terminal device the downlink information is sent to, therefore, the second network node carries the identification information of the terminal device while sending the downlink information, and the identification information of the terminal device is configured to instruct the first network node to forward the downlink information to the correct terminal device.

The information transmission method provided in the embodiment of the present application is applied to a case of downlink sending, and also for the terminal device in the light connection state in the standardization process of the LTE R14 and in the inactive state in the 5G system, when the downlink information of the source base station (i.e., the second network node) reaches, the downlink data is sent to the first network node (i.e., the target base station) that establishes a connection with the terminal device, and is sent via the common transmission channel established between the first network node and the second network node. Since the reserved character for identifying the terminal device is configured in the user plane protocol of the common transmission channel, the second network node may fill the identification information of the terminal device in the reserved character upon sending the downlink information, namely the identification information of the terminal device is simultaneously sent, such that the first network node may know to which terminal device the downlink information is sent after receiving the downlink information, and thus correctly send the downlink information.

In the information transmission method provided in the embodiment of the present application, by means of the common transmission channel established between the first network node and the second network node and of the reserved character configured in the user plane protocol of the common transmission channel and used for identifying the terminal device, after the second network node has downlink information for the terminal device that moves out of the service area of the second network node, the second network node sends the downlink information together with the identification information of the terminal device to the target serving base station (i.e., the first network node) of the terminal device via the common transmission channel, and the first network node may send the downlink information to the designated terminal device according to the identification information of the terminal device. The method provided in the embodiment of the present application may also be applied to a case that the base station carries out downlink sending by means of the common transmission channel established between the base stations and of the relevant configuration of the user plane protocol, and the method provided in the embodiment of the present application has a higher practicability in an application scenario where the terminal device in the inactive state or the light connection state receives the downlink information.

The information transmission method provided in the embodiment of the present application is not only applicable to a traditional integrated base station, but also applicable to a CU-DU network architecture.

In an application scenario of the integrated base station, the first network node is the target base station of the terminal device, and the second network node is a source base station of the terminal device. The implementation manner of this application scenario has been described in detail in the foregoing embodiment, and therefore no further description is provided herein.

In an application scenario of the CU-DU network architecture, reference is made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer are generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission method applied to the CU-DU separate network architecture according to the embodiment of the present application may also be shown in FIG. 8 (where the RLC is retained at a source side, i.e., the source DU).

In this embodiment of the present application, the implementation manner of the above-mentioned S620 may include:

the RLC layer of the source DU receives downlink information sent by the PDCP layer of the CU as well as initial identification information of the terminal device, and processes the initial identification information to obtain the identification information of the terminal device;

the RLC layer of the source DU sends the downlink information and the identification information of the terminal device to the target DU via a common transmission channel.

Since the channel for information transmission between the target DU and the source DU for the terminal device in the inactive state is common, the GTP-U related protocol is enhanced, that is, the target DU adds the identification information of the terminal device in the GTP-U protocol header, and the format may refer to the data structure shown in FIG. 5.

In one embodiment, since the RLC layer is kept in the source DU, that is, the format of a data packet that the target DU transmits to the source DU via the interface between the target DU and the source DU is a MAC SDU or a RLC PDU. Therefore, in the embodiment of the present application, interfaces and rules of a GTP-U SDU and a RLC PDU are pre-configured in the CU-DU network architecture.

When the method provided in the embodiment of the present application is adopted to transmit downlink information in an application scenario of a CU-DU network architecture, the signaling interaction manner of the source DU, the target DU and the CU may refer to the flowchart shown in FIG. 14, and the implementation manner is described in detail in the above embodiment, and therefore no further description is provided herein.

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, the method provided in the embodiment of the present application may further include: the RLC layer of the source DU transmits the parameter configuration information of the RLC layer to the target DU via the common transmission channel.

Figure 16:
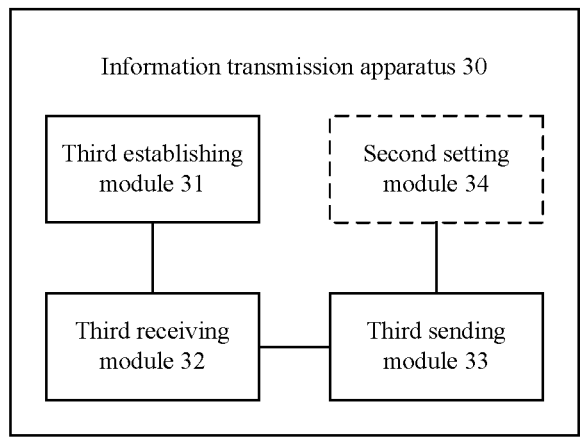
FIG. 16 is a schematic structural diagram of still another information transmission apparatus provided in an embodiment of the present application.

FIG. 16 is a schematic structural diagram of still another information transmission apparatus provided in an embodiment of the present application. The information transmission apparatus provided in this embodiment is applicable to the situation that the terminal device in the inactive state or the light connection state performs information transmission with the source serving base station after moving out of a service area of the source serving base station, and the information transmission apparatus is implemented by combining a hardware and a software, and the apparatus may be integrated in a processor of a first network node (i.e., a target serving base station) for the processor to invoke. As shown in FIG. 16, the information transmission apparatus 30 of the present embodiment may include a third establishing module 31, a third receiving module 32 and a third sending module 33.

The third establishing module 31 is configured to establish the common transmission channel with the second network node, where a reserved character for identifying the terminal device is configured in a user plane protocol of the common transmission channel.

The information transmission apparatus provided in the embodiment of the present application is configured to perform information transmission between the terminal device and the source serving base station. An application scenario of the embodiment of the present application is that: the terminal device in the inactive state or the light connection state moves out of the service area of the second network node and moves to a service area of the first network node, when uplink information of the terminal device reaches the second network node or the downlink data of the second network node reaches the terminal device, at this time, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a GTP protocol. The first establishing module 11 in this embodiment of the present application may establish the common transmission channel between the first network node and the second network node, although the common transmission channel established between the first network node and the second network node is configured to transmit data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP-U protocol, and the reserved character is used to fill identification information of the terminal device in the subsequent information transmission.

A third receiving module 32 is configured to receive, via the common transmission channel established by the third establishing module 31, downlink information sent to the terminal device by the second network node and the identification information of the terminal device, where the terminal device is in an inactive state or a light connection state and moves from a service area of the second network node to a service area of the first network node, and the second network node fills the identification information of the terminal device in the reserved character while sending the downlink information to the first network node.

The third sending module 33 is configured to send the downlink information to the terminal device matched with the identification information of the terminal device according to the identification information of the terminal device received by the third receiving module 32.

In the embodiment of the present application, since the terminal device has moved out of the service area of the second network node and enters the service area of the first network node, when downstream data reaches, the second network node sends the downstream information (including downstream data/downstream control information) to the first network node that establishes a connection with the terminal device, and at the same time, sends the identification information of the terminal device to the first network node, and after the third receiving module 32 of the first network node receives these information, the third sending module 33 may forward the downlink information to the designated terminal device according to the identification information of the terminal device, since the third establishing module 31 has configured the reserved character for identifying the terminal device in the user plane protocol upon establishing the common transmission channel, the second network node may fill the identification information of the terminal device in the reserved character and send the identification information to the first network node while sending the downlink information.

In the embodiment of the present application, the identification information of the terminal device is filled in a GTP-U protocol header, that is, is filled in the reserved character configured when the common transmission channel is established above, for example, the identification information of the terminal device may be a resume ID, a truncated resume ID or other forms of terminal equipment identifiers (UE-IDs), and a data format of the GTP-U protocol header may be referred to FIG. 5. The third receiving module 32 of the first network node knows the target terminal device to which the downlink information is to be sent after receiving the downlink information sent by the second network node, however, since the common transmission channel (i.e., a GTP tunnel) between the first network node and the second network node is common, if the third receiving module 32 only receives the downlink information, it does not know which terminal device the downlink information is sent to, therefore, the second network node carries the identification information of the terminal device while sending the downlink information, and the identification information of the terminal device is configured to instruct the first network node to forward the downlink information to the correct terminal device.

The information transmission apparatus provided in the present embodiment is configured to execute the information transmission method shown in FIG. 13 in the embodiment of the present application, and has a corresponding functional module, and the implementation principle and technical effect thereof are similar to the previous implementation principle and technical effect, and thus no further description is provided herein.

The information transmission apparatus provided in the embodiment of the present application is not only applicable to a traditional integrated base station, but also applicable to a CU-DU network architecture.

In an application scenario of the integrated base station, the first network node is a target base station of the terminal device, and the second network node is a source base station of the terminal device. The implementation manner of this application scenario has been described in detail in the foregoing embodiment, and therefore no further description is provided herein.

In an application scenario of the CU-DU network architecture, reference may also be made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission apparatus applied to the CU-DU separate network architecture according to the embodiment of the present application may also be shown in FIG. 8 (where the RLC is retained at a source side, i.e., the source DU).

In this embodiment of the present application, the implementation manner in which the third receiving module 32 receives, via the common transmission channel, the downlink information sent by the second network node to the terminal device and the identification information of the terminal device may include: the third receiving module 32 is configured to receive, by the target DU via the common transmission channel, downlink information sent by the RLC layer of the source DU and identification information of the terminal device, where the downlink information is sent to the source DU by the PDCP layer of the CU, and the identification information of the terminal device is obtained by the source DU according to the initial identification information received from the PDCP layer of the CU.

In this embodiment, since the channel for information transmission between the target DU and the source DU for the terminal device in the inactive state is common, the GTP-U related protocol is enhanced, that is, the target DU adds the identification information of the terminal device in the GTP-U protocol header, and the format may also refer to the data structure shown in FIG. 5. In addition, since the RLC layer is kept in the source DU, that is, the format of the data packet that transmitted by the target DU to the source DU via the interface between the target DU and the source DU is a MAC SDU or RLC PDU, in the embodiment of the present application, the interfaces and rules of the GTP-U SDU and the RLC PDU are pre-configured in the CU-DU network architecture.

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, three manners may be adopted.

In a manner 1, the third receiving module 32 is further configured to receive, by the target DU, the parameter configuration information of the RLC layer sent by the RLC layer of the source DU via the common transmission channel established by the third establishing module 31.

In a manner 2, the apparatus provided in the embodiment of the present application may further include a second setting module 34 and a third sending module.

The second setting module 34 is configured such that the target DU sets the parameter configuration information of the RLC layer of the target DU.

The third sending module 33 is further configured to send the parameter configuration information of the RLC layer set by the second setting module 34 to the RLC layer of the source DU via the common transmission channel by the target DU, and send the parameter configuration information of the RLC layer to the CU through the RLC layer of the source DU. The third sending module 33 is further configured to send the parameter configuration information of the RLC layer to the terminal device after the target DU receives the determination instruction message sent by the RLC layer of the source DU; the determining instruction message is a message sent to the RLC layer of the source DU after the CU determines to use the parameter configuration information of the RLC layer.

In a manner 3, the second setting module 34 is configured such that the target DU sets the parameter configuration information of the RLC layer of the target DU.

The third sending module 33 is further configured to send the parameter configuration information of the RLC layer set by the second setting module 34 to the terminal device through the MAC CE by the target DU.

In practical applications, the third receiving module 32 and the third sending module 33 in the embodiments shown in FIG. 16 of the present application may be implemented by a transceiver of the first network node, and the third establishing module 31 and the second setting module 34 may be implemented by a processor of the first network node, where the processor may be, for example, a CPU, or an ASIC, or one or more integrated circuits implementing the embodiments of the present application, where the first establishing module 11 and the third establishing module 31 may be the same or different.

Figure 17:
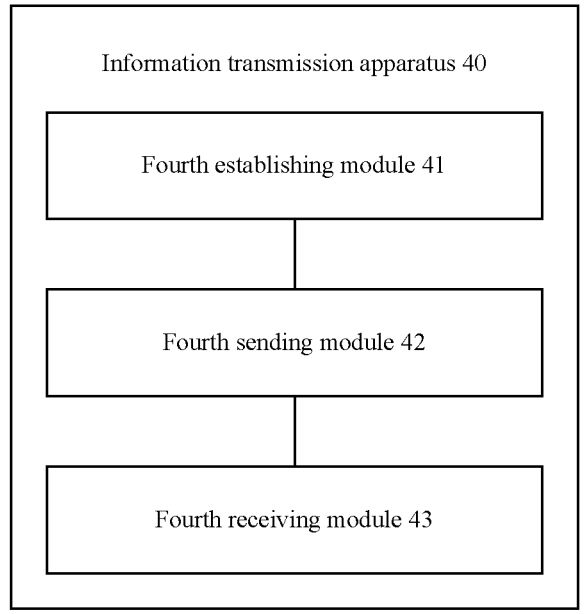
FIG. 17 is a schematic structural diagram of yet another information transmission apparatus provided in an embodiment of the present application.

FIG. 17 is a schematic structural diagram of yet another information transmission apparatus provided in an embodiment of the present application. The information transmission apparatus provided in this embodiment is applicable to the situation that the terminal device in the inactive state or the light connection state performs information transmission with the source serving base station after moving out of the source serving base station, where the information transmission apparatus is implemented by combining a hardware and a software, and the apparatus may be integrated in a processor of a second network node (i.e., a source serving base station) for the processor to invoke. As shown in FIG. 17, the information transmission apparatus 40 provided in the embodiment of the present application may include a fourth establishing module 41 and a fourth sending module 42.

The fourth establishing module 41 is configured to establish the common transmission channel with the first network node, where a reserved character for identifying the terminal device is configured in a user plane protocol of the common transmission channel.

The information transmission apparatus provided in the embodiment of the present application is configured to perform information transmission between the terminal device and the source serving base station. An application scenario of the embodiment of the present application is that: the terminal device in the inactive state or the light connection state moves out of the service area of the second network node and moves to a service area of the first network node, when uplink information of the terminal device reaches the second network node or the downlink data of the second network node reaches the terminal device, at this time, the service node establishing connection with the terminal device is the first network node, and therefore the terminal device performs information transmission with the second network node through the first network node.

In the LTE system, a wired connection may be established between base stations to construct the common transmission channel, for example, the common transmission channel is a GTP tunnel based on a GTP protocol. The second establishing module 21 in this embodiment of the present application may establish the common transmission channel between the first network node and the second network node, the common transmission channel established between the first network node and the second network node is configured to transmit data information and control information between the two network nodes, the common transmission channel is based on the GTP protocol, and the transmission of the data information is based on a GTP user plane protocol. Since the channel between the two network nodes is common, related information for identifying the terminal device is added to the GTP user plane protocol, for example, the reserved character may be added to the GTP-U protocol, and the reserved character is used to fill identification information of the terminal device in the subsequent information transmission.

The fourth sending module 42 is configured to send the downlink information sent to the terminal device and the identification information of the terminal device to the first network node via the common transmission channel established by the fourth establishing module 41, where the terminal device is in an inactive state and moves from a service area of a second network node to a service area of the first network node, and the second network node fills the identification information of the terminal device in the reserved character while sending the downlink information to the first network node.

In the embodiment of the present application, since the terminal device has moved out of the service area of the second network node and enters the service area of the first network node, when the second network node has downlink data to be transmitted, the downlink information (including downlink data/downlink control information) is sent to the first network node that establishes a connection with the terminal device by its fourth sending module 42, and meanwhile, the identification information of the terminal device is sent to the first network node, where the first network node may send the downlink information to the designated terminal device according to the identification information of the terminal device, since the fourth establishing module 41 has configured the reserved character for identifying the terminal device in the user plane protocol upon establishing the common transmission channel, the fourth sending module 42 may fill the identification information of the terminal device in the reserved character and send to the first network node while sending the downlink information.

In the embodiment of the present application, the identification information of the terminal device is filled in a GTP-U protocol header, that is, is filled in the reserved character configured when the common transmission channel is established above, for example, the identification information of the terminal device may be a resume ID, a truncated resume ID or other forms of UE-IDs, and a data format of the GTP-U protocol header may be referred to FIG. 5. The first network node knows the target terminal device to which the downlink information is to be sent after receiving the downlink information sent by the second network node, however, since the common transmission channel (i.e., a GTP tunnel) between the first network node and the second network node is common, if the first network node only receives the downlink information, it does not know which terminal device the downlink information is sent to, therefore, the fourth sending module 42 of the second network node carries the identification information of the terminal device while sending the downlink information, and the identification information of the terminal device is configured to instruct the first network node to forward the downlink information to the correct terminal device.

The information transmission apparatus provided in present embodiment is configured to execute the information transmission method shown in FIG. 15 in the embodiment of the present application, and has a corresponding functional module, and the implementation principle and technical effect thereof are similar to the previous implementation principle and technical effect, and thus no further description is provided herein.

The information transmission apparatus provided in the embodiment of the present application is not only applicable to a traditional integrated base station, but also applicable to a CU-DU network architecture.

In an application scenario of the integrated base station, the first network node is a target base station of the terminal device, and the second network node is a source base station of the terminal device. The implementation manner of this application scenario has been described in detail in the foregoing embodiment, and therefore no further description is provided herein.

In an application scenario of the CU-DU network architecture, reference may also be made to the C-RAN architecture shown in FIG. 6, and the structure and the deployment manner of the C-RAN architecture are described in detail in the foregoing embodiments, and therefore no further description is provided herein. In this application scenario, the first network node is a target DU and CU of the terminal device in the CU-DU network architecture, and the second network node is a source DU and CU of the terminal device in the CU-DU network architecture.

Reference is made to the CU-DU separate network architecture shown in FIG. 7, in the inactive state technology, for the sending of the uplink data or the downlink data, the MAC layer and the PHY layer generally adopt a default configuration, and therefore how the RLC layer, the PDCP layer, and the like to be handled is considered in the embodiment of the present application. The embodiment of the present application takes the RLC layer reserved in the source DU as an example to describe a manner in which the terminal device and the network device are verified under the CU-DU separate network architecture. The application scenario of the information transmission apparatus applied to the CU-DU separate network architecture according to the embodiment of the present application may also be shown in FIG. 8 (where the RLC is retained at a source side, i.e., the source DU).

In the embodiment of the present application, the information transmission apparatus 40 may further include a fourth receiving module 43; the implementation manner in which the second network node sends the downlink information sent to the terminal device and the identification information of the terminal device to the first network node via the common transmission channel may include a fourth receiving module 43 and a fourth sending module 42.

The fourth receiving module 43 is configured to receive, by the RLC layer of the source DU, the downlink information and the initial identification information sent by the PDCP layer of the CU, and process the initial identification information to obtain identification information of the terminal device.

The fourth sending module 42 is further configured to send the downlink information and the identification information of the terminal device to the target DU via the common transmission channel by the RLC layer of the source DU.

In this embodiment, since the channel for information transmission between the target DU and the source DU for the terminal device in the inactive state is common, the GTP-U related protocol is enhanced, that is, the target DU adds the identification information of the terminal device in the GTP-U protocol header, and the format may also refer to the data structure shown in FIG. 5. In addition, since the RLC layer is kept in the source DU, that is, the format of the data packet that transmitted by the target DU to the source DU via the interface between the target DU and the source DU is a MAC SDU or RLC PDU, in the embodiment of the present application, the interfaces and rules of the GTP-U SDU and the RLC PDU are pre-configured in the CU-DU network architecture.

In the scenario of applying the embodiment of the present application to the CU-DU network architecture, the relevant parameters and configuration information above the MAC layer are still retained on the source side, and the relevant parameters and configuration information of the target DU and the source DU are kept aligned, because the scheduling is performed by the MAC layer of the target DU, and some parameters above the MAC layer are related to the scheduling, in order to ensure that the scheduling and parameters of the target DU are matched, in the apparatus provided in the embodiment of the present application may include a fourth sending module 42.

The fourth sending module 42 is further configured to send the parameter configuration information of the RLC layer to the target DU via the common transmission channel established by the fourth establishing module 41 by the RLC layer of the source DU.

In practical applications, the fourth sending module 42 and the fourth receiving module 43 shown in FIG. 17 in the above-mentioned embodiment of the present application may be implemented by a transceiver of the second network node, and the fourth establishing module 41 may be implemented by a processor of the second network node, where the processor may be, for example, a CPU, an ASIC, or one or more integrated circuits implementing the embodiment of the present application, where the second establishing module 21 and the fourth establishing module 41 may be the same or different.

It will be understood by those of ordinary skill in the art that all or part of the steps of the above methods may be implemented by a program to instruct associated hardware (e.g., a processor) the program may be stored in a computer readable storage medium such as a read only memory, a magnetic or optical disk, etc. All or some of the steps of the above embodiments may also be implemented using one or more integrated circuits. Each module/unit in the above embodiments may be implemented in hardware, for example, by an integrated circuit to implement its corresponding function, or be implemented in software, for example, by a processor executing a program/instruction stored in a memory to implement its corresponding function.

INDUSTRIAL APPLICABILITY

The information transmission method and apparatus provided in the present disclosure can reduce the network delay for information transmission.

What is claimed is:
1. An information transmission method, comprising:
  establishing, by a first network node, a common transmission channel with a second network node, wherein a reserved character for identifying a terminal device is configured in a user plane protocol of the common transmission channel;
  receiving, by the first network node, uplink information sent by the terminal device, wherein the terminal device is in an inactive state and moves from a service area of the second network node to a service area of the first network node;
  sending, by the first network node, the uplink information and identification information of the terminal device to the second network node via the common transmission channel, wherein the first network node fills the identification information of the terminal device in the reserved character while sending the uplink information; and
  receiving, by the first network node, via the common transmission channel, a parsing result obtained from parsing the uplink information by the second network node, wherein the parsing result is obtained from parsing the uplink information by the second network node according to the identification information of the terminal device;
  wherein the first network node is a target distributed unit (DU) and a central unit (CU) of the terminal device in a central unit-distributed unit (CU-DU) network architecture, and the second network node is a source distributed unit (DU) and the central unit (CU) of the terminal device in the CU-DU network architecture,
  wherein sending, by the first network node, the uplink information and the identification information of the terminal device to the second network node via the common transmission channel comprises:

sending, by the target DU, the uplink information and the identification information of the terminal device to a radio link control (RLC) layer of the source DU via the common transmission channel, and sending the uplink information and the identification information of the terminal device to a packet data convergence protocol (PDCP) layer of the CU via the RLC layer of the source DU;

wherein receiving, by the first network node, via the common transmission channel, the parsing result obtained from parsing the uplink information by the second network node comprises:

receiving, by the target DU, via the common transmission channel, a parsing result sent by the source DU, wherein the parsing result is obtained from parsing the uplink information by the PDCP layer of the CU, and the parsing result is sent to the RLC layer of the source DU via the PDCP layer of the CU.

2. The information transmission method of claim 1, wherein the first network node is a target base station of the terminal device, and the second network node is a source base station of the terminal device.

3. The information transmission method of claim 1, wherein interfaces and rules for a user plane protocol service data unit (SDU) and a RLC layer protocol data unit (PDU) are preconfigured in the CU-DU network architecture.

4. The information transmission method of claim 1, further comprising one of:

receiving, by the target DU, via the common transmission channel, parameter configuration information of the RLC layer sent by the RLC layer of the source DU;

setting, by the target DU, parameter configuration information of a RLC layer of the target DU, sending the parameter configuration information of the RLC layer of the target DU to the RLC layer of the source DU via the common transmission channel and sending the parameter configuration information of the RLC layer of the target DU to the CU via the RLC layer of the source DU; and after receiving a determining instruction message sent by the RLC layer of the source DU, sending, by the target DU, the parameter configuration information of the RLC layer to the terminal device; wherein the determining instruction message is sent to the RLC layer of the source DU after the CU determines to use the parameter configuration information of the RLC layer; or setting, by the target DU, parameter configuration information of a RLC layer of the target DU, and sending the parameter configuration information of the RLC layer of the target DU to the terminal device through a media access control control element (MAC CE).

5. An information transmission method, comprising:

establishing, by a second network node, a common transmission channel with a first network node, wherein a reserved character for identifying a terminal device is configured in a user plane protocol of the common transmission channel;

receiving, by the second network node, via the common transmission channel, uplink information and identification information of the terminal device sent by the first network node, wherein the uplink information is sent from the terminal device in an inactive state to the first network node after the terminal device moves from a service area of the second network node to a service area of the first network node, and the first network node fills the identification information of the terminal device in the reserved character while sending the uplink information;

parsing, by the second network node, the uplink information according to the identification information of the terminal device to obtain a parsing result; and sending, by the second network node, the parsing result to the first network node via the common transmission channel;

wherein the second network node is a source distributed unit (DU) and a central unit (CU) of the terminal device in a central unit-distributed unit (CU-DU) network architecture, and the first network node is a target distributed unit (DU) and the central unit (CU) of the terminal device in the CU-DU network architecture, wherein receiving, by the second network node, via the common transmission channel, the uplink information and the identification information of the terminal device sent by the first network node comprises:

receiving, by a radio link control (RLC) layer of the source DU, via the common transmission channel, the uplink information and the identification information of the terminal device sent by the target DU;

sending, by the RLC layer of the source DU, the uplink information and the identification information of the terminal device to a packet data convergence protocol (PDCP) layer of the CU;

wherein parsing, by the second network node, the uplink information according to the identification information of the terminal device comprises:

receiving, by the source DU, a parsing result sent by the PDCP layer of the CU, wherein the parsing result is obtained from parsing the uplink information by the PDCP layer of the CU according to the identification information of the terminal device;

wherein sending, by the second network node, the parsing result to the first network node via the common transmission channel comprises:

sending, by the source DU, the parsing result to the target DU via the common transmission channel.

6. The information transmission method of claim 5, wherein the second network node is a source base station of the terminal device, and the first network node is a target base station of the terminal device.

7. The information transmission method of claim 5, wherein interfaces and rules for a user plane protocol service data unit (SDU) and a RLC layer protocol data unit (PDU) are preconfigured in the CU-DU network architecture.

8. The information transmission method of claim 5, further comprising:

sending, by the RLC layer of the source DU, parameter configuration information of the RLC layer to the target DU via the common transmission channel.

9. An information transmission apparatus, arranged in a second network node, wherein the information transmission apparatus comprises:

a processor; and a memory for storing instructions executable by the processor, wherein the processor is configured to implement the method of claim 5.

10. The information transmission apparatus of claim 9, wherein the second network node is a source base station of the terminal device, and the first network node is a target base station of the terminal device.

11. The information transmission apparatus of claim 9, wherein the second network node is a source distributed unit (DU) and a central unit (CU) of the terminal device in a central unit-distributed unit (CU-DU) network architecture, and the first network node is a target distributed unit (DU) and the central unit (CU) of the terminal device in the CU-DU network architecture, wherein the processor is configured such that a radio link control (RLC) layer of the source DU receives, via the common transmission channel, the uplink information and the identification information of the terminal device sent by the target DU;

the processor is configured such that the RLC layer of the source DU sends the uplink information and the identification information of the terminal device to a packet data convergence protocol (PDCP) layer of the CU;

the processor is configured such that the source DU receives a parsing result sent by the PDCP layer of the CU, wherein the parsing result is obtained from parsing the uplink information by the PDCP layer of the CU according to the identification information of the terminal device; and the processor is further configured such that the source DU sends the parsing result to the target DU via the common transmission channel.

12. The information transmission apparatus of claim 11, wherein interfaces and rules for a user plane protocol service data unit (SDU) and a RLC layer protocol data unit (PDU) are preconfigured in the CU-DU network architecture.

13. The information transmission apparatus of claim 11, wherein the processor is further configured such that the RLC layer of the source DU sends the parameter configuration information of the RLC layer to the target DU via the common transmission channel.

14. An information transmission apparatus, arranged in a first network node, wherein the information transmission apparatus comprises:
 a processor; and
 a memory for storing instructions executable by the processor,
wherein the processor is configured to:
 establish a common transmission channel with a second network node, wherein a reserved character for identifying a terminal device is configured in a user plane protocol of the common transmission channel;
 receive uplink information sent by the terminal device, wherein the terminal device is in an inactive state and moves from a service area of the second network node to a service area of the first network node; and
 send the uplink information and identification information of the terminal device to the second network node via the common transmission channel, wherein the first network node fills the identification information of the terminal device in the reserved character while sending the uplink information;
wherein the processor is further configured to receive, via the common transmission channel, a parsing result obtained from parsing the uplink information by the second network node, wherein the parsing result is obtained from parsing the uplink information by the second network node according to the identification information of the terminal device;

wherein the first network node is a target distributed unit (DU) and a central unit (CU) of the terminal device in a central unit-distributed unit (CU-DU) network architecture, and the second network node is a source distributed unit (DU) and the central unit (CU) of the terminal device in the CU-DU network architecture, wherein the processor is configured such that: the target DU sends the uplink information and the identification information of the terminal device to a radio link control (RLC) layer of the source DU via the common transmission channel, and sends the uplink information and the identification information of the terminal device to a packet data convergence protocol (PDCP) layer of the CU via the RLC layer of the source DU;

the processor is configured such that: the target DU receives, via the common transmission channel, a parsing result sent by the source DU, wherein the parsing result is obtained from parsing the uplink information by the PDCP layer of the CU, and the parsing result is sent to the RLC layer of the source DU via the PDCP layer of the CU.

15. The information transmission apparatus of claim 14, wherein the first network node is a target base station of the terminal device, and the second network node is a source base station of the terminal device.

16. The information transmission apparatus of claim 14, wherein interfaces and rules for a user plane protocol service data unit (SDU) and a RLC layer protocol data unit (PDU) are preconfigured in the CU-DU network architecture.

17. The information transmission apparatus of claim 14, wherein the processor is further configured such that: the target DU receives, via the common transmission channel, parameter configuration information of the RLC layer sent by the RLC layer of the source DU; or
 the processor is further configured such that the target DU sets parameter configuration information of a RLC layer of the target DU;
 the processor is further configured such that: the target DU sends the parameter configuration information of the RLC layer of the target DU to the RLC layer of the source DU via the common transmission channel, and sends the parameter configuration information of the RLC layer of the target DU to the CU via the RLC layer of the source DU; the processor is further configured such that the target DU sends the parameter configuration information of the RLC layer to the terminal device after the target DU receives a determination instruction message sent by the RLC layer of the source DU; wherein the determining instruction message is sent to the RLC layer of the source DU after the CU determines to use the parameter configuration information of the RLC layer;
 the processor is further configured such that the target DU sends the parameter configuration information of the RLC layer to the terminal device through a media access control control element (MAC CE).

\* \* \* \* \*